United States Patent
Yoshida

(10) Patent No.: US 7,355,765 B2
(45) Date of Patent: Apr. 8, 2008

(54) OPTICAL SCANNING APPARATUS AND AN IMAGE FORMATION APPARATUS THEREWITH

(75) Inventor: Yoshiki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1113 days.

(21) Appl. No.: 10/413,203

(22) Filed: Apr. 15, 2003

(65) Prior Publication Data

US 2004/0036757 A1 Feb. 26, 2004

(30) Foreign Application Priority Data

Apr. 17, 2002 (JP) .............................. 2002-114791
Dec. 20, 2002 (JP) .............................. 2002-369300

(51) Int. Cl.
H04N 1/46 (2006.01)
G01D 15/14 (2006.01)

(52) U.S. Cl. ...................... 358/501; 358/505; 358/511; 347/225

(58) Field of Classification Search ................ 358/501, 358/505, 511; 347/225
See application file for complete search history.

(56) References Cited

U.S. PATENT DOCUMENTS

| | | | |
|---|---|---|---|
| 4,410,234 A | 10/1983 | Mikami et al. | |
| 4,933,874 A | 6/1990 | Asada et al. | |
| 4,967,284 A | 10/1990 | Yoshida et al. | |
| 5,027,117 A | 6/1991 | Yoshida et al. | |
| 5,068,676 A | 11/1991 | Yoshida et al. | |
| 5,309,182 A | 5/1994 | Mama et al. | |
| 5,376,994 A | 12/1994 | Mama et al. | |
| 5,477,330 A | 12/1995 | Dorr | |
| 6,163,334 A | 12/2000 | Irie et al. | |
| 6,281,922 B1 | 8/2001 | Suzuki | |
| 7,050,080 B2 * | 5/2006 | Ema et al. | ................... 347/235 |
| 2002/0135668 A1 | 9/2002 | Takaki et al. | |

FOREIGN PATENT DOCUMENTS

| | | |
|---|---|---|
| EP | 0 375 434 | 6/1990 |
| EP | 0 810 768 | 12/1997 |
| EP | 1 220 526 | 7/2002 |
| JP | 2-282763 | 11/1990 |
| JP | 2-291573 | 12/1990 |
| JP | 6-242386 | 9/1994 |
| JP | 8-286132 | 11/1996 |

OTHER PUBLICATIONS

U.S. Appl. No. 10/785,117, filed Feb. 25, 2004, Yoshida.

* cited by examiner

*Primary Examiner*—Houshang Safaipour
(74) *Attorney, Agent, or Firm*—Oblon, Spivak, McClelland, Maier & Neustadt, P.C.

(57) ABSTRACT

An optical scanning apparatus provides improved image quality by changing the amount of writing scale compensation for a pixel clock during a scanning cycle. A pixel clock generation unit of the optical scanning apparatus divides the scanning cycle into multiple division periods. A phase change of the pixel clock is carried out for each of the division periods. The phase change can also be different from scanning cycle to scanning cycle.

34 Claims, 20 Drawing Sheets

OPTICAL SCANNING APPARATUS AND AN IMAGE FORMATION APPARATUS THEREWITH

BACKGROUND OF THE INVENTION

1. Field of the Invention

The present invention generally relates to an optical scanning apparatus that scans a target scanning surface of a medium to be scanned by a laser beam irradiated from a laser light source, and an image formation apparatus, such as a laser printer, a digital copier, and facsimile equipment equipped with the optical scanning apparatus, using an electronic photographing method.

2. Description of the Related Art

An optical scanning apparatus, which is used by the image formation apparatuses, periodically irradiates a laser beam from a laser light source, which is deflected by a rotating polygon mirror, and an electrostatic latent image is produced on a target scanning surface by the laser beam repetitively scanning in a first scanning direction, to be called the main scanning direction, while the target scanning surface (beforehand charged uniformly by an electrification apparatus) of a photo conductor (scanned medium) moves (rotates) in a second direction, to be called the sub-scanning direction.

The laser beam deflected by the polygon mirror is detected by sync detection means serving as a sync detection sensor at a position that is outside of an image domain (e.g., immediately before a writing start position, or immediately after a writing end position) in the main scanning direction of the target scanning surface.

If the sync detection sensor detects the laser beam, it generates a sync detection signal that specifies the writing start position in the main scanning direction for the laser beam, and outputs the sync detection signal to a laser driving unit, such that the writing position is aligned on the target scanning surface.

After receiving the sync detection signal, and a predetermined time period elapses (i.e., after the laser beam is detected by the sync detection sensor), the laser driving unit starts modulation (ON/OFF) of the laser light source (a laser diode) according to an image signal, and a corresponding laser beam is irradiated.

In this manner, even if there is a division angle error in each reflective face of the polygon mirror, the writing start position can always be aligned at the same position on the target scanning surface, and the writing end position can also be arranged at the same position on the target scanning surface.

Here, a controller, which is not illustrated, transmits image data of a page line by line (scan by scan) as the image signal (video signal) to the laser driving unit. Further, the laser driving unit outputs the image signal to the laser light source in sync with a pixel clock (writing clock), and modulation is performed. The image clock is input via a phase sync unit from a pixel clock generation unit, which constitutes pixel clock generation means and phase setting means.

Here, relations between the pixel clock and its phase change (phase setup) are briefly explained with reference to FIG. 19.

FIG. 19 is a timing chart that shows an example of the relations between the pixel clock and its phase change.

The pixel clock generation unit generates and outputs the pixel clock clkw in the following manner. An oscillator that is not illustrated generates a standard clock (basic clock) clko, repetition frequency of which is n times as high as the pixel clock clkw (4 times in FIG. 19); and a high level (H) and a low level (L) of a signal are toggled every 4 pulses of the standard clock clko by a counting control in sync with the detection signal provided by the sync detection sensor.

The optical scanning apparatus mentioned above is arranged so that writing density of the beam spot becomes uniform when the beam spot of the laser beam is formed on the target scanning surface, and an electrostatic latent image is produced. However, when properties of an optical system change with environmental change etc., errors can occur in writing scale (optical scanning length) per main scanning period of the laser beam generated by the polygon mirror, thereby degrading quality of the image to be output. In order to compensate for the error in the writing scale of the laser beam, a phase change is performed, which shifts the phase of the pixel clock clkw.

Further, there are conventional optical scanning apparatuses that are installed with two or more laser light sources. In the case of such optical scanning apparatuses, the phase change is also performed such that the phase of the pixel clock clkw is shifted in order to compensate for the errors in the writing scale, since the errors (writing scale differences) per scanning period due to the differences in the wavelength of each laser light source can adversely affect the image to be output.

In the optical scanning apparatuses mentioned above, the pixel clock generation unit controls the phase shift of the pixel clock clkw using an external pulse sequence xpls. Specifically, for example, when the pixel clock clkw is generated from the standard clock clko, with the external pulse sequence xpls being input, the pixel clock clkw that is usually generated after 8 pulses of clko, e.g., can be generated after 9 pulses of clko or 7 pulses of clko by changing the number of pulses to be counted. In this manner, the frequency of the pixel clock clkw can be increased to 8/7 times the original frequency (progress control) or decreased to 8/9 times the original frequency (delay control), and the phase of the pixel clock clkw is afterwards shifted. The effect of this is to make the writing scale to be m−7/8 and m+9/8, that is shortened and extended, respectively, where m represents the original time of the whole main scanning line. FIG. 19 demonstrates the case of 1/4 phase shift.

Then, in the conventional optical scanning apparatuses, the above-mentioned external pulse sequence xpls (called simply "pulse" hereinafter) is generated corresponding to a position where the phase change of the pixel clock clkw sequence is desired to occur. For this purpose, the pixel clock generation unit includes a pulse generation unit 99 such as shown by FIG. 20. When a scan in the main scanning direction of the laser beam by the polygon mirror is performed based on a pulse generation interval (period) prd set up in a comparator 101, and a number num that is the number of pulses set up in a comparator 102 by an engine CPU that is not illustrated, the pulse generation unit 99 performs the following operations.

A counter 103 starts a counting operation for counting the number of the pixel clocks clkw when a clear signal xlclr generated from the sync detection signal by a circuit that is not illustrated is received, and when a stop signal is received from the comparator 102, the count operation is stopped.

The comparator 101 compares a count value i of the counter 103 with a predetermined pulse generation interval value prd, and generates the pulse xpls whenever the count value i reaches the predetermined pulse generation interval value prd.

A counter 104 counts the number of the pulses xpls generated by the comparator 101.

The comparator 102 compares a count value j of the counter 104 with the predetermined number of pulses num, and generates a stop signal, when the count value j reaches the predetermined number num.

The operations of the pulse generation unit 99 are explained in detail. As shown in FIG. 21, the count values i and j of the counters 103 and 104, respectively, of the pulse generation unit 99 are first reset when the power supply is turned on.

Then, after the clear signal xlclr is received, whenever the counter 103 receives a pixel clock clkw, the counter 103 increments its count, and when the count value i reaches the predetermined value prd, the comparator 101 generates the pulse xpls. The counter 103 resets the count value i to "1" when receiving the pulse xpls.

Further, the counter 104 increments its count when the pulse xpls is received.

Henceforth, the counters 103 and 104, and the comparator 101 repeat the above-mentioned operations. When the count value j of the counter 104 reaches the predetermined value num, the comparator 102 generates a stop signal. In this manner, the operations (called pulse generating operations) of the pulse generation unit 99 are completed.

The pulse sequence generated by the pulse generating operation by the pulse generation unit 99 is as shown by FIG. 22.

In addition to the method mentioned above, another method for generating the fixed pulse sequence is available, wherein the fixed pulse sequence is generated from data output by counting up an address by the pixel clock clkw, using a RAM table, and the like.

There is technology that provides highly precise phase control of the pixel clock for a conventional image formation apparatus (for example, patent reference 1). Further, there is technology that suppresses color shifts in the middle position of an image for an image formation apparatus equipped with two or more photo conductors (for example, patent reference 2).

Patent reference 1: Japanese Application for patent No. 2001-290469 (pp 1-4)

Patent reference 2: JP, 2-291573,A (pp 1-2)

However, according to the pulse generating methods mentioned above using the pulse generation unit 99, the phase change occurs at the same part (the same distance from either edge of the image). In this case, even if there is a phase difference that may not be noticeable in several scanning lines, the output image bears a conspicuous linear pattern produced by image density differences, which appears like a vertical line.

Further, the external pulse sequence xpls is generated irrelevant to the scanning position of the laser beam. If the external pulse sequence xpls is generated when the scanning position of the laser beam is outside of an image domain, the output image is shifted. If the external pulse sequence xpls is generated after the scanning end of the image domain, the external pulse sequence xpls cannot substantially contribute to compensation of the image.

Furthermore, conventionally, the external pulse sequence xpls is generated with only one set of parameters, such as pulse width and cycle. Therefore, even though the phase change is carried out using the external pulse sequence xpls, only one kind of phase control, whether expanding or contracting, can be provided for the whole pixel clock within one scanning period. Therefore, there is a problem that the conventional method cannot provide a solution for a fault that requires a partial compensation of the writing scale.

SUMMARY OF THE INVENTION

Accordingly, it is a general object of the present invention to provide an optical scanning apparatus and an image formation apparatus therewith, which raise image quality for a low cost, by realizing the partial compensation of the writing scale for the pixel clock, and which substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the optical scanning apparatus and the image formation apparatus therewith particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention provides an optical scanning apparatus that includes a sync detection sensor for generating and outputting a sync detection signal that detects a laser beam and specifies a writing start position in a main scanning direction by the laser beam outside of an image domain, pixel clock generation means for generating and outputting a pixel clock, and phase setting means for changing the phase of the pixel clock output for each of division periods that are divisions of a scanning period of the laser beam.

The optical scanning apparatus includes a rotating polygon mirror that periodically deflects the laser beam, and scans a target scanning surface of a medium to be scanned that moves in a sub-scanning direction that is perpendicular to the main scanning direction such that an electrostatic latent image is produced on the target scanning surface.

Since the optical scanning apparatus changes the phase of the pixel clock output for every division period, the writing scale can be compensated for each division period, i e., the partial compensation is realized.

Further, the phase setting means of the optical scanning apparatus carry out the partial phase change in a time unit shorter than the pixel clock cycle.

Further, the phase setting means of the optical scanning apparatus change the timing for setting up the phase for each division period for every scan of the laser beam.

Further, the present invention provides phase setting means for changing the phase of the pixel clock output within a predetermined period, achieving partial compensation.

In this case, also, the phase setting means of the optical scanning apparatus of the present invention perform the partial phase change in a time unit shorter than the pixel clock cycle.

Furthermore, the optical scanning apparatus provides a capability to change the timing of the phase setup within the predetermined period for every scan of the laser beam.

Furthermore, the optical scanning apparatus is provided with a prepositive phase setting means for setting up the phase within a period before scanning of the image domain by the laser beam again.

The present invention further provides the image formation apparatus that is equipped with the optical scanning apparatus of the present invention for forming an image.

The image formation apparatus of the present invention may be provided with only one photo conductor as the medium to be scanned for producing a monochrome image through an electrostatic latent image on the target scanning surface of the photo conductor with the laser beam irradiated from the optical scanning apparatus.

Alternatively, the above-mentioned optical scanning apparatus installed by the image formation apparatus may be provided with a plurality of laser diodes (or a laser diode array), each serving for a different color, and a plurality of photo conductors, corresponding to each color, as the medium to be scanned, such that an electrostatic latent image corresponding to each color is produced on the target scanning surface of each of the photo conductors by the laser beam irradiated from each of the laser diodes. Each of the electrostatic latent images is developed by a toner in the color. The toner developed images are then transferred to a sheet of paper via a middle transfer belt, producing a color image print.

The present invention provides pattern formation means for forming a pattern for detecting an amount of position displacement of the images in different colors. Further, the present invention provides a control such that the pattern formation timing at which the pattern is formed by the pattern formation means and the phase setting timing at which the phase is changed by the phase setting means do not overlap each other.

The control enables the image formation apparatus to produce a high-quality image.

Furthermore, the present invention provides a position displacement detection sensor for detecting the position displacements by reading the pattern. A control is further provided such that the detection timing by the detection sensor does not overlap with the phase setting timing by the phase setting means.

Since reading of the pattern for detecting the amount of position displacements by the position detection sensor is performed at a different timing from the phase change, reading by the position detection sensor is stabilized.

It is desirable that a plurality of the patterns and corresponding detection sensors be provided.

The present invention considers that a beam spot of the laser beam has an area, rather than a pin point spot, and allows that the detection timing is defined as a time period, rather than a point in time.

An improved result is obtained by changing the amount of the phase change for each of the division periods.

DESCRIPTION OF THE PREFERRED EMBODIMENTS

In the following, embodiments of the present invention will be specifically described with reference to the accompanying drawings.

Figure 2:
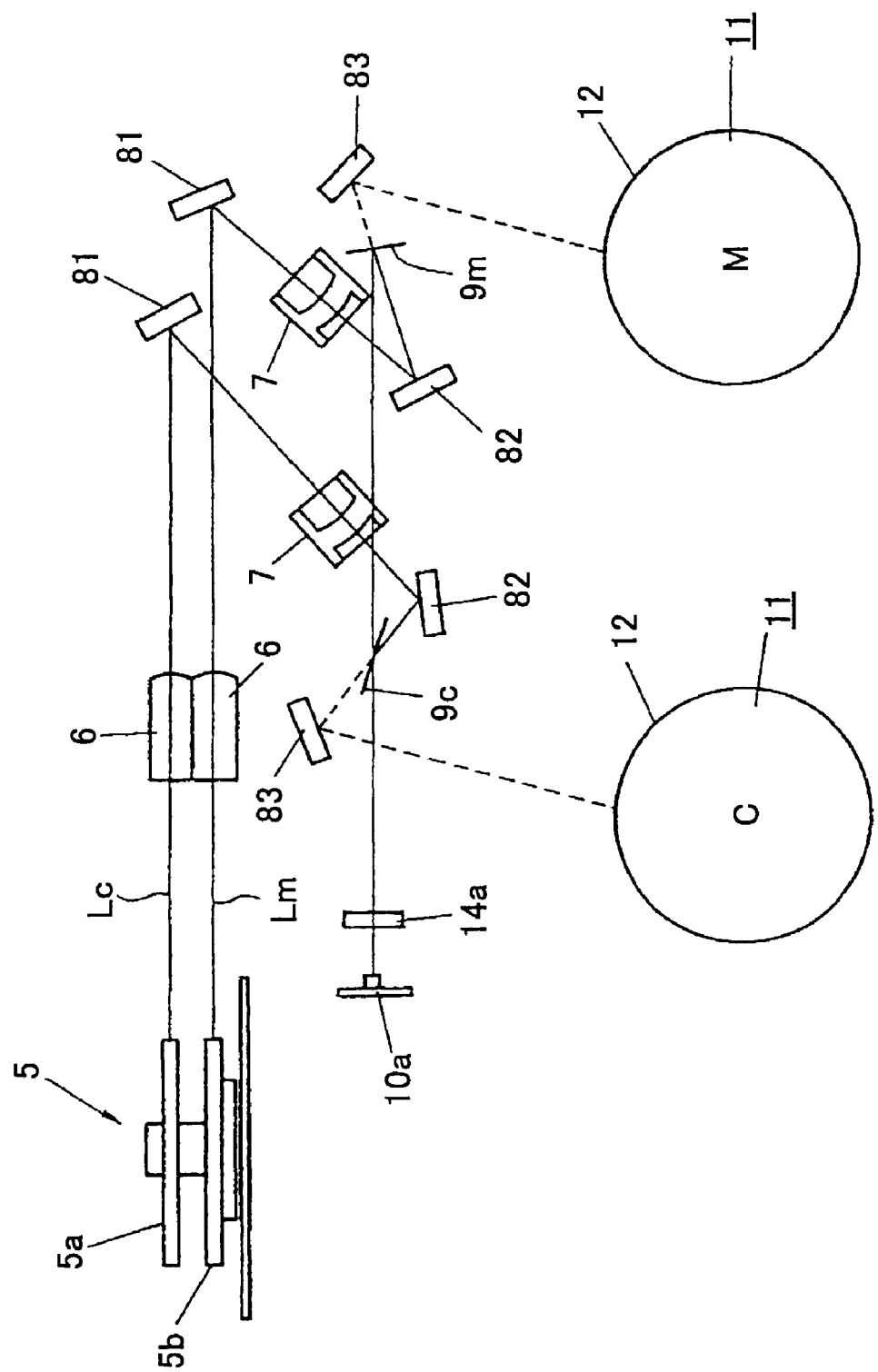
FIG. 2 is a schematic side view showing an example of arrangement relations of each optical element and each photo conductor drum that constitute an optical scanning apparatus of the present invention, wherein only one side of a rotating deflection unit is shown.
Figure 3:
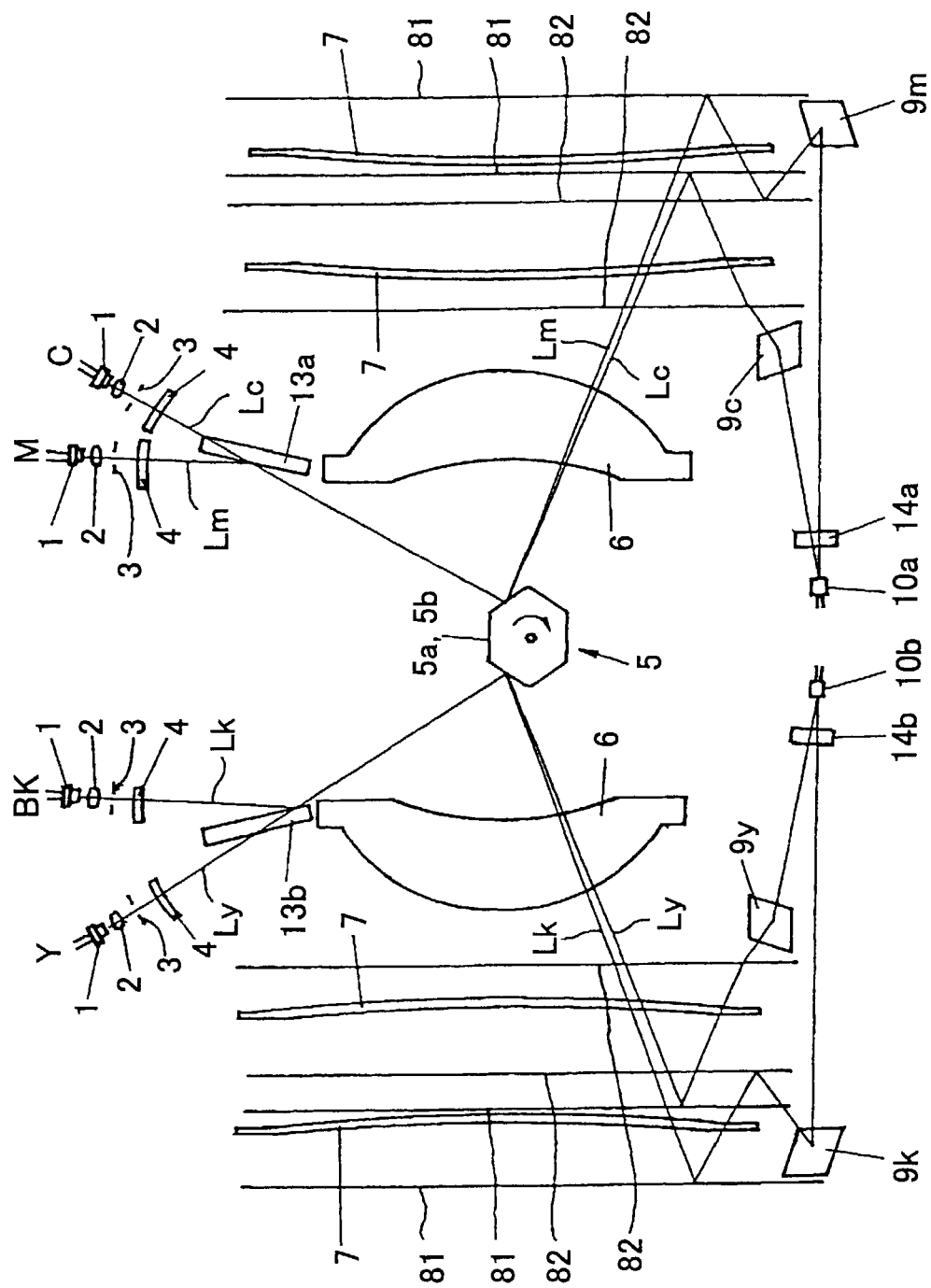
FIG. 3 is a schematic plan view showing an example of an overall structure of the optical scanning apparatus.

FIG. 2 is a schematic side view (side optical path view) showing an example of arrangement relations of each optical element and each photo conductor drum that constitute the optical scanning apparatus of the present invention, wherein only one side of a rotating deflection unit (polygon scanner) is shown. FIG. 3 is a schematic plan view (plan optical path view) showing an example of an overall structure of the optical scanning apparatus.

The optical scanning apparatus generates an electrostatic latent image by four laser beams irradiated from four laser light sources 1, each of the laser beams being periodically deflected by a rotation deflecting unit 5 that includes a two-step polygon mirror consisting of two polygon mirrors 5a and 5b, and scanning the surface of a respective target scanning surface 12 of four photo conductor drums 11, respectively, that rotate in the sub-scanning direction, the scanning being carried out in the main scanning direction that is perpendicular to the sub-scanning direction.

As shown in FIG. 3, the optical scanning apparatus is provided with four light source units, each unit including the laser light source 1, a coupling lens 2, an aperture 3, and a cylindrical lens 4, the cylindrical lens 4 serving as a first individual imaging optical system for each of the laser beams irradiated from each of the light source units.

The light source units are provided in order to irradiate different colors, namely, magenta (M), cyan (C), yellow (Y), and black (BK), each of the light source units irradiating a laser beam Lm, Lc, Ly, and Lk, respectively.

The laser beam irradiated from the laser light source 1 is reshaped by the coupling lens 2, and passes through the aperture 3. Each of the laser beams Lm, Lc, Ly, and Lk for its respective color forms a long linear image in the main scanning direction through the cylindrical lens 4 that is the first imaging optical system near the reflective surface of the polygon mirrors 5a and 5b of the rotating deflection unit 5.

The rotating deflection unit 5 is constituted in two stages, i.e., the polygon mirrors 5a and 5b are arranged as an upper mirror and a lower mirror, respectively, in a stack as shown in FIG. 2. The laser beam Lc for cyan color and the laser beam Ly for yellow color are provided to the polygon mirror 5a in the upper stage, and the laser beam Lm for magenta color and the laser beam Lk for black color are provided to the polygon mirror 5b in the lower stage.

Here, for ease of manufacturing, the laser light source 1 for magenta color and the laser light source 1 for cyan color are arranged separately in the horizontal direction; and the laser light source 1 for black color and the laser light source 1 for yellow color are arranged separately in the horizontal direction, as shown in FIG. 3. Therefore, irradiation directions of the laser beams Lm and Lc differ from each other; and the irradiation directions of the laser beams Ly and Lk differ from each other.

For this reason, a mirror 13a is provided for deflecting the laser beam Lm in the same direction of incidence to the rotating deflection unit 5 as the laser beam Lc; and a mirror 13b is provided for deflecting the laser beam Lk in the same direction of incidence to the rotating deflection unit 5 as the laser beam Ly.

Then, the laser beams Lm, Lc, Ly, and Lk are deflected by the polygon mirrors 5a and 5b of the rotating deflection unit 5 such that the target scanning surfaces are scanned. Then, the laser beams pass through a first scanning lens 6, are deflected by a deflection mirror 81, pass through a second scanning lens 7, are deflected by second and third deflecting mirrors 82 and 83, respectively, and form an image on each target scanning surface 12 of the four photo conductor drums 11 for the respective colors. Here, the first scanning lens 6 and the second scanning lens 7 constitute a second imaging optical system; and the reflecting mirrors 81, 82 and 83 are as shown in FIG. 2. In this manner, the scanning in the main scanning direction of each target scanning surface 12 is performed by the respective laser beams Lm, Lc, Ly, and Lk. Here, the first scanning lens 6 is an fθ lens, and the second scanning lens 7 is a long toroidal lens.

In this manner, the main scanning that simultaneously scans the target scanning surface 12 of each of the four photo conductor drums 11 in the main scanning direction for forming the images in the respective colors of magenta (M), cyan (C), yellow (Y), and black (BK) by the four laser beams Lm, Lc, Ly, and Lk is performed.

It should be noted that FIG. 2 shows only components relative to magenta (M) color and cyan (C) color. Namely, only the two (out of four) photo conductor drums 11 for M and C are shown; the corresponding first and second scanning lenses 6 and 7; and the corresponding first, second, and third reflecting mirrors 81, 82, and 83 are shown, which are for making the laser beams Lm and Lc scan respective target scanning surfaces 12 in the z-axis direction (i.e., direction that is perpendicular to the surface of this paper).

Further, in FIG. 3, although the first and the second deflection mirrors 81 and 82 are not necessarily formed perpendicular to the surface of this paper, only the portion at which the laser beam is actually provided is shown in a straight line for convenience of illustration. Further, the third deflection mirror 83 and the photo conductor drum 11 are omitted from FIG. 3.

In FIG. 2, optical paths from the laser light sources 1 to the polygon mirrors 5a and 5b are omitted, and optical components on the omitted optical paths are also omitted.

The structure of the optical scanning apparatus, as shown in FIG. 3, is simplified by arranging such that simultaneous incidence of the laser beams irradiated by different laser light sources is carried out on respective polygon mirrors 5a and 5b of the rotating deflection unit 5, the polygon mirrors 5a and 5b deflecting the laser beams Lm and Lc, respectively; and the polygon mirrors 5a and 5b deflecting laser beams Ly and Lk, respectively.

The optical scanning apparatus is characterized by a position at which a synchronous mirror comprising reflective means is prepared. Specifically, synchronous mirrors 9m, 9c, 9y, and 9k, corresponding to the four laser beams Lm, Lc, Ly, and Lk, respectively, are prepared near the outside of an edge of each optical path that scans the target scanning surface 12 of the photo conductor drum 11 and in a plane parallel to the target scanning surface on which each laser beam Lm, Lc, Ly, and Lk is scanned by the polygon mirrors 5a and 5b (i.e., outside of the image domain in the main scanning direction) as shown by FIG. 2 and FIG. 3.

The two laser beams Lc and Lm scanned by the polygon mirrors 5a and 5b, respectively, are deflected by the synchronous mirrors 9c and 9m, respectively, prepared in this manner, and provided to a sync detection sensor 10a, which comprises a sync detection sensor for the two laser beams as shown in FIG. 3.

Similarly, the two laser beams Ly and Lk scanned by the polygon mirrors 5a and 5b, respectively, are deflected by the synchronous mirrors 9y and 9k, respectively, and provided to a sync detection sensor 10b, which comprises a sync detection sensor for the two laser beams as shown in FIG. 3 In addition, the laser light sources 1 are controlled such that the irradiating timing of the laser beam Lc becomes different from the irradiating timing of the laser beam Lm; and the irradiating timing of the laser beam Ly becomes different from the irradiating timing of the laser beam Lk, in order that the laser beams Lc and Lm are not simultaneously provided to the sync detection sensor 10a; and in order that the laser beams Ly and Lk are not simultaneously provided to the sync detection sensor 10b.

Further, the optical scanning apparatus includes a condenser (lens) 14a before the sync detection sensor 10a, and a condenser (lens) 14b before the sync detection sensor 10b in order to facilitate incidence of the laser beams on the sync detection sensors 10a and 10b. However, these condensers 14a and 14b are not indispensable.

Further, additional mirrors may be provided in order to guide the laser beam reflected by the synchronous mirrors 9m, 9c, and 9y, 9k to the sync detection sensors 10a and 10b, respectively.

By providing the synchronous mirrors in the position as described above, a plurality of laser beams reflected by the surface of the polygon mirrors can be provided to the sync detection sensors, enabling a reduction in the number of sync detection sensors and simplifying the structure of the optical producing apparatus, which can be made small for low cost.

Especially, in the optical scanning apparatus that scans two or more scan target media as in this embodiment, by providing the synchronous mirrors in the optical path after each laser beam from the polygon mirror is individually deflected by the reflection mirror, incidence on a common sync detection sensor can be carried out. Specifically, for example, the incidence on the common sync detection sensor of the two or more laser beams for different scanning target surfaces, which are deflected by the two-stage polygon mirrors 5a and 5b, can be carried out by providing the synchronous mirror on a plane that is parallel to the target scanning surface as shown by FIG. 2.

Figure 4:
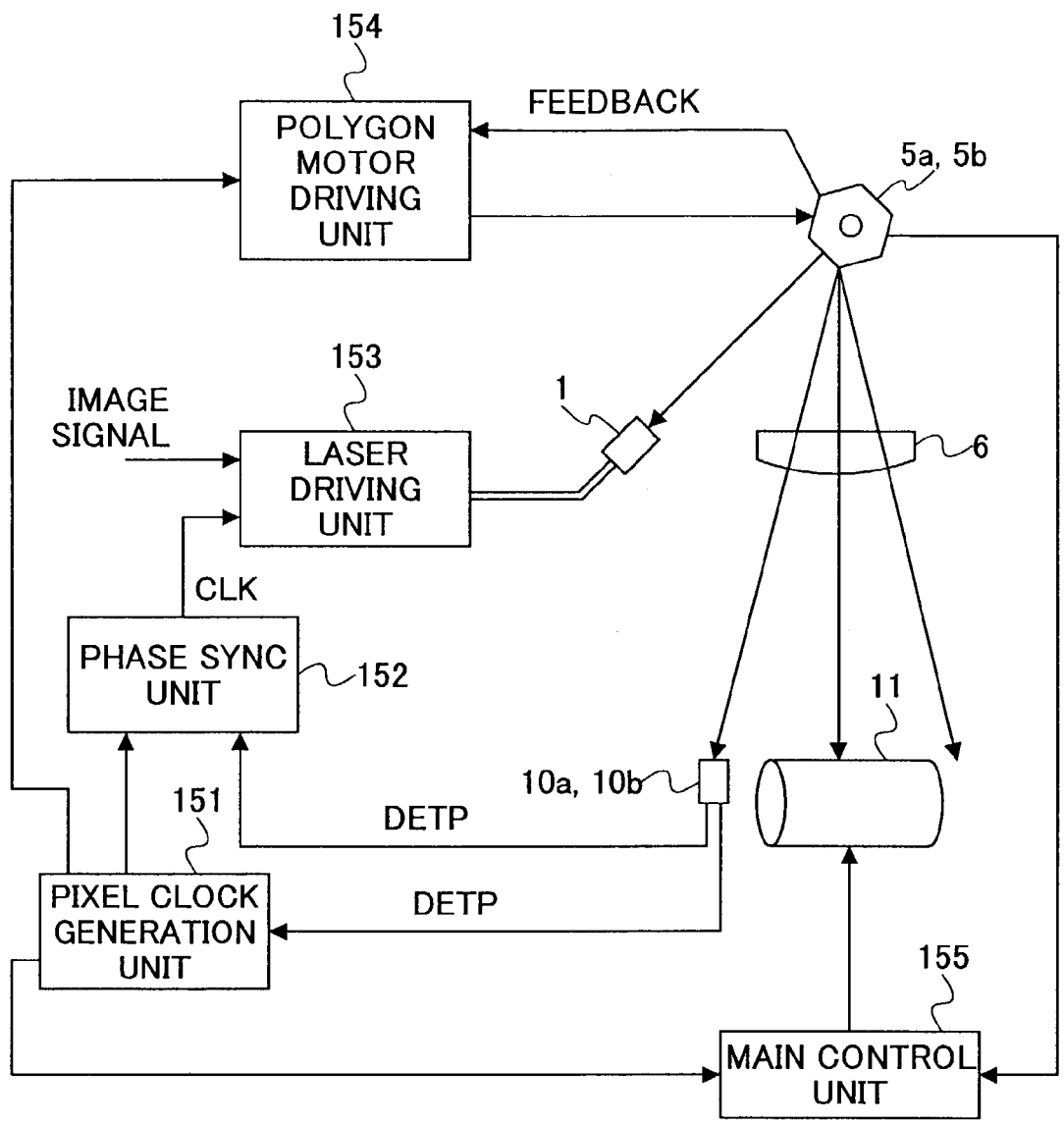
FIG. 4 is a block diagram showing an example of the structure of the principal part of the optical scanning apparatus.

FIG. 4 is a block diagram showing the structure of the principal part of the optical scanning apparatus. Here, illustration of most of the optical system shown in FIG. 2 and FIG. 3 is omitted, and FIG. 4 mainly shows a control system.

The laser beams Lm, Lc, Ly, and Lk pass through the respective first scanning lens 6, and are reflected by the respective first deflection mirror 81, the respective second deflection mirror 82, and the synchronous mirrors 9m, 9c, 9y, and 9k (omitted from FIG. 4), respectively. Then, the laser beams scan the respective scanning target surfaces 12 of the photo conductor drums 11 in the main scanning direction, after arriving at the position of the sync detection sensors 10a and 10b, respectively, arranged just before the scanning target surface 12 (containing an image domain) of the photo conductor drum 11 (outside of the image domain of the scanning target surface 12 in the main scanning direction).

When the sync detection sensors 10a and 10b, serving as the sync detection means, detect a corresponding laser beam, a sync detection signal DETP is output to a pixel clock generation unit 151 and a phase sync unit 152.

The pixel clock generation unit 151 comprises both pixel clock generation means and phase setting means, which are the main features of the present invention. The pixel clock generation unit 151 generates and outputs two or more pixel clocks clkw, each clock having a unique phase for each color and being in sync with the sync detection signals DETP that are input by the sync detection sensors 10a and 10b.

At this time, the pixel clock generation unit 151 operates as the phase setting means, and performs a phase setup (phase change) that changes the phase of a high level or a low level of each pixel clock clkw that should be output for every division period. Here, the division period is a fraction of a scanning period of the polygon mirrors 5a and 5b, the scanning period being divided into a plurality of division periods. Here, the scanning period is: the scanning period of all domains including the image domain and the domain outside of the image domain of the scanning target surface 12; or the scanning period of all domains less the domain outside the image domain. In this manner, the phase change is carried out for every division period, therefore, the pixel clock generation unit 151 can compensate for the writing scale of the scanning period partially for every division period. In other words, the partial phase change can be carried out, wherein the phase of the transition to the high level or low level of each pixel clock clkw can be changed in a finer time unit than a pixel clock cycle.

On the other hand, the sync detection signal DETP is provided to the phase sync unit 152 from the sync detection sensors 10a and 10b for every scan by the polygon mirrors 5a and 5b.

The phase sync unit 152 selects a pixel clock clkw that is the closest to the phase of the sync detection signal DETP from two or more pixel clocks clkw that are input from the pixel clock generation unit 151 with varied phases according to each color, and outputs the selected pixel clock clkw to a laser driving unit 153 as a writing clock CLK.

The laser driving unit 153 modulates (ON/OFF) the laser light irradiated by the laser light source 1 based on the image signal supplied by a controller, which is not illustrated, in sync with the writing clock CLK, and makes the laser light source 1 irradiate the laser beam corresponding to the image signal for image formation.

A polygon motor driving unit 154 drives a polygon motor (not illustrated) based on the pixel clock clkw input from the pixel clock generation unit 151 and a feedback signal from the polygon motor, and rotates the polygon mirrors 5a and 5b at a predetermined speed.

A main control unit 155 includes various control units such as an engine CPU, a main motor control unit, and an electronic photograph process control unit.

The engine CPU is a microcomputer that consists of a central processing unit, a program ROM, etc., and controls the whole engine unit (the main part of the image formation apparatus) including the optical scanning apparatus.

The main motor control unit drives a main motor that is not illustrated based on the pixel clock clkw input from the pixel clock generation unit 151, and the feedback signal from the polygon motor according to directions of the engine CPU, and rotates each photo conductor drum 11 at a predetermined speed.

The electronic photograph process control unit controls an electronic photograph processing apparatus (not illustrated) for image formation according to directions of the engine CPU.

In the following, a structure and operations of a pulse generation unit 180 contained in the pixel clock generation unit 151 of FIG. 4 are explained with reference to FIG. 1 and FIGS. 5 through 12. The pulse generation unit 180 performs functions that characterize the present invention. Here, only the pulse generation unit corresponding to one laser light source is explained for explanation convenience.

First, an example of a structure and operations of the pulse generation unit in the pixel clock generation unit 151 of FIG. 4 is explained with reference to FIG. 1, FIG. 5, and FIG. 6.

Figure 1:
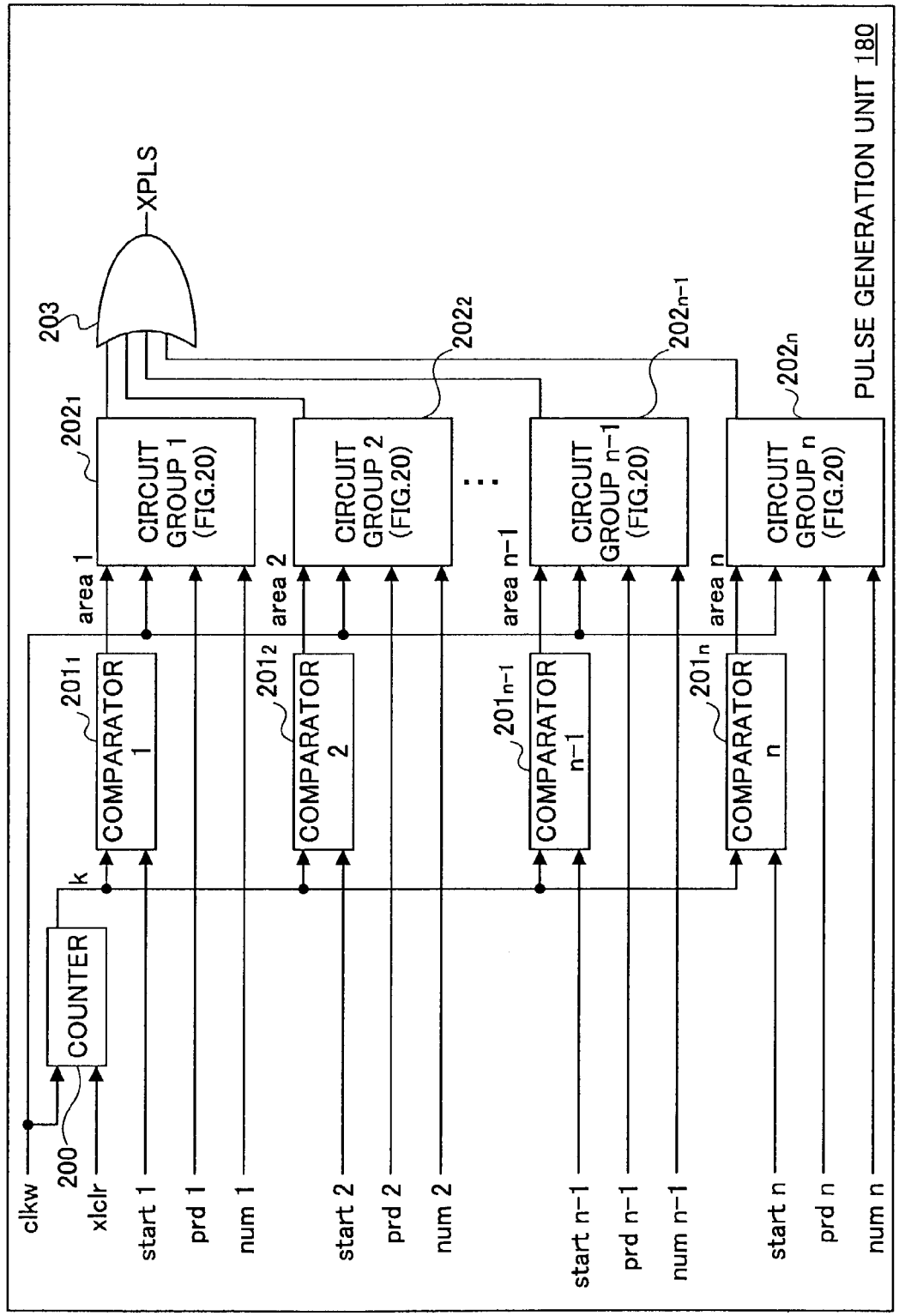
FIG. 1 is a block diagram showing a first example of the structure of a pulse generation unit of a pixel clock generation unit 151 that is shown by FIG. 4.

FIG. 1 is a block diagram showing the structure of the pulse generation unit 180 of the pixel clock generation unit 151 of FIG. 4.

Figure 5:
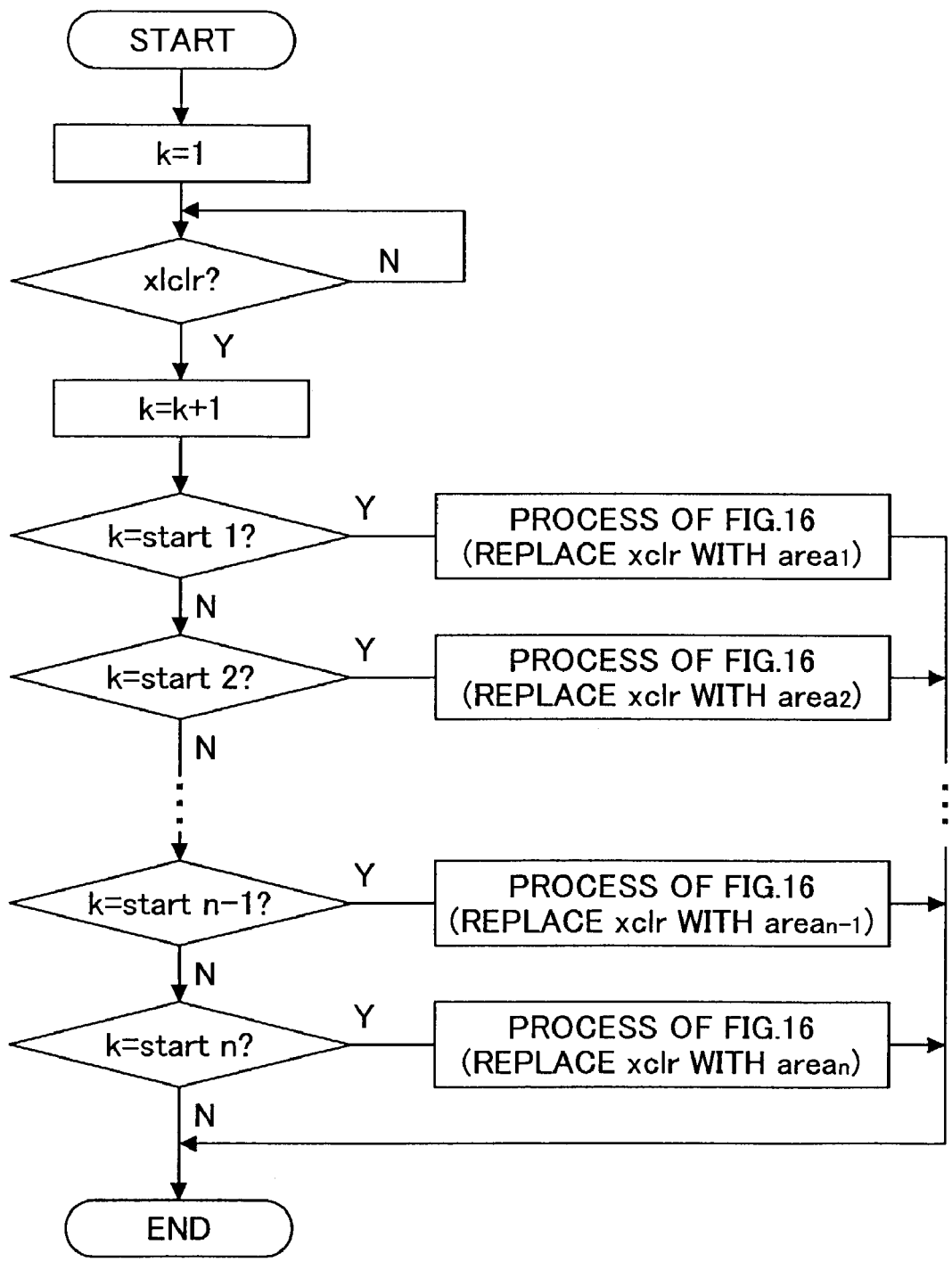
FIG. 5 is a flowchart showing operations of the pulse generation unit shown by FIG. 1.

FIG. 5 is a flowchart showing operations of the pulse generation unit 180 shown in FIG. 1.

Figure 6:
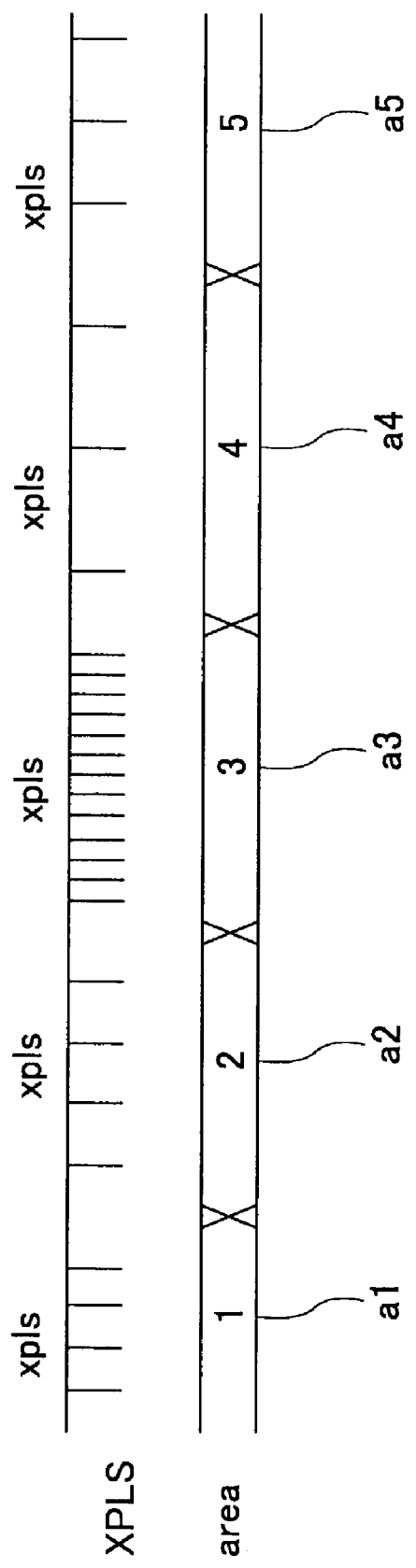
FIG. 6 is a timing chart showing relations between an external pulse sequence generated by the pulse generation unit shown by FIG. 1 and each division period.

FIG. 6 is a timing chart showing relations of an external pulse sequence generated by the pulse generation unit 180 shown in FIG. 1 with each division period.

The pulse generation unit 180 shown in FIG. 1 includes a counter 200, n pieces of comparators $201_1$, $201_2$, ..., $201_{n-1}$, and $201_n$, n pieces of circuit groups $202_1$, $202_2$, ..., $202_{n-1}$, and $202_n$, and an OR circuit 203.

The counter 200 is provided with a clear signal xlclr generated by the sync detection signal DETP by a circuit that is not illustrated, counts the number of the pixel clocks clkw starting from the time of receiving the clear signal xlclr, and outputs a count value k. The count value k is used in order to divide a scanning period of the polygon mirrors 5a and 5b into a plurality of division periods.

Each of the comparators $201_1, 201_2, \ldots, 201_{n-1}$, and $201_n$ is beforehand provided with a starting point value (the first starting point value through the n-th starting point value) corresponding to each division period (the first division period through the n-th division period), respectively, and compares the count value k of the counter 200 with the corresponding starting point value. When the count value k reaches the starting point value of one of the comparators, the comparator outputs an area signal (the first area signal through the n-th area signal). The starting point value of each division period is set up by a start signal (the first start signal through the n-th start signal) provided to the comparators $201_1, 201_2, \ldots, 201_{n-1}$, and $201_n$ from the engine CPU in the main control unit 155 of FIG. 4.

For example, the comparator $201_1$ compares the count value k of the counter 200 with the starting point value (the first starting point value) of the first division period indicated by the first start signal value $start_1$. When the count value k reaches the first start signal value $start_1$, the first area signal $area_1$ is output.

Similarly, the comparator $201_2$ compares the count value k of the counter 200 with the starting point value (the second starting point value) of the next division period (the second division period) indicated by the second start signal value $start_2$. When the count value k reaches, the second start signal value $start_2$, the second area signal $area_2$ is output, and so on.

Figure 20:
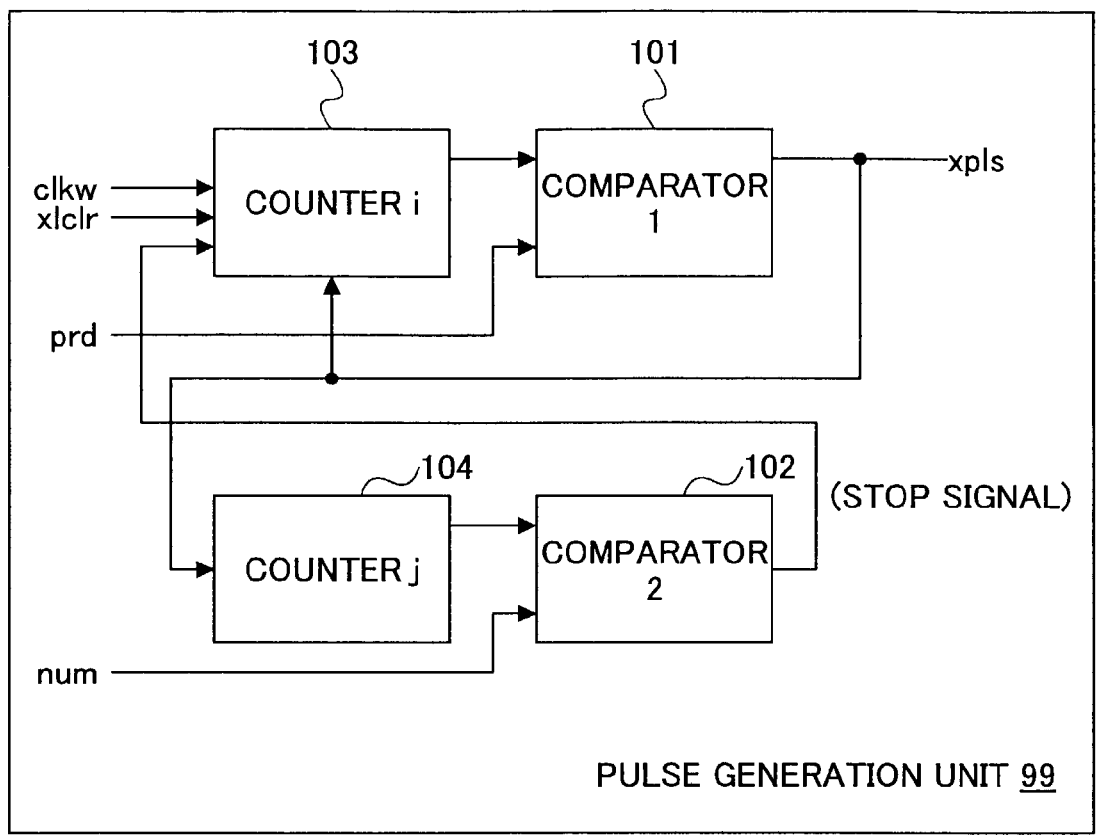
FIG. 20 is a block diagram showing an example of the structure of the pulse generation unit of the pixel clock generation unit conventionally used by an optical scanning apparatus.
Figure 21:
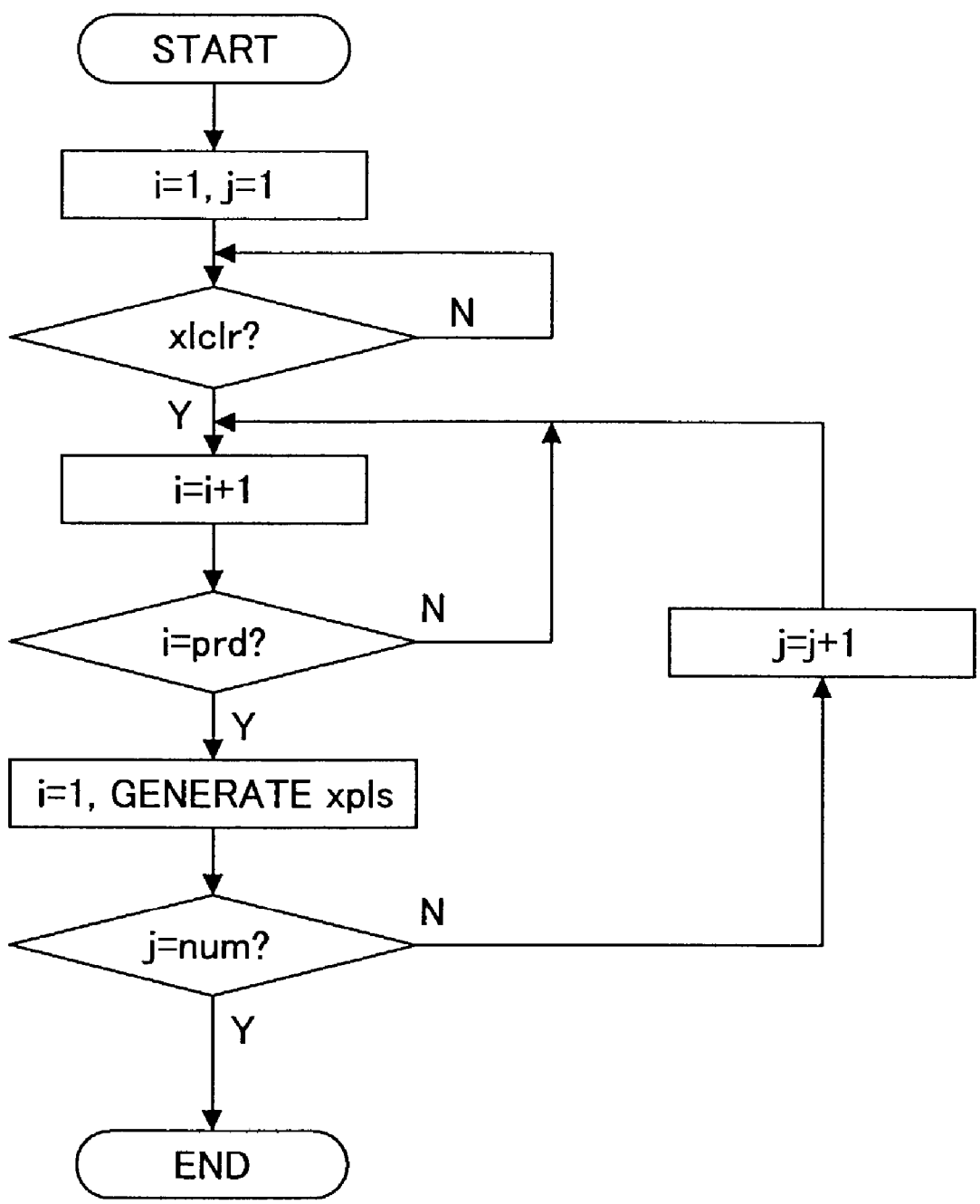
FIG. 21 is a flowchart showing operations of the pulse generation unit shown by FIG. 20.
Figure 22:
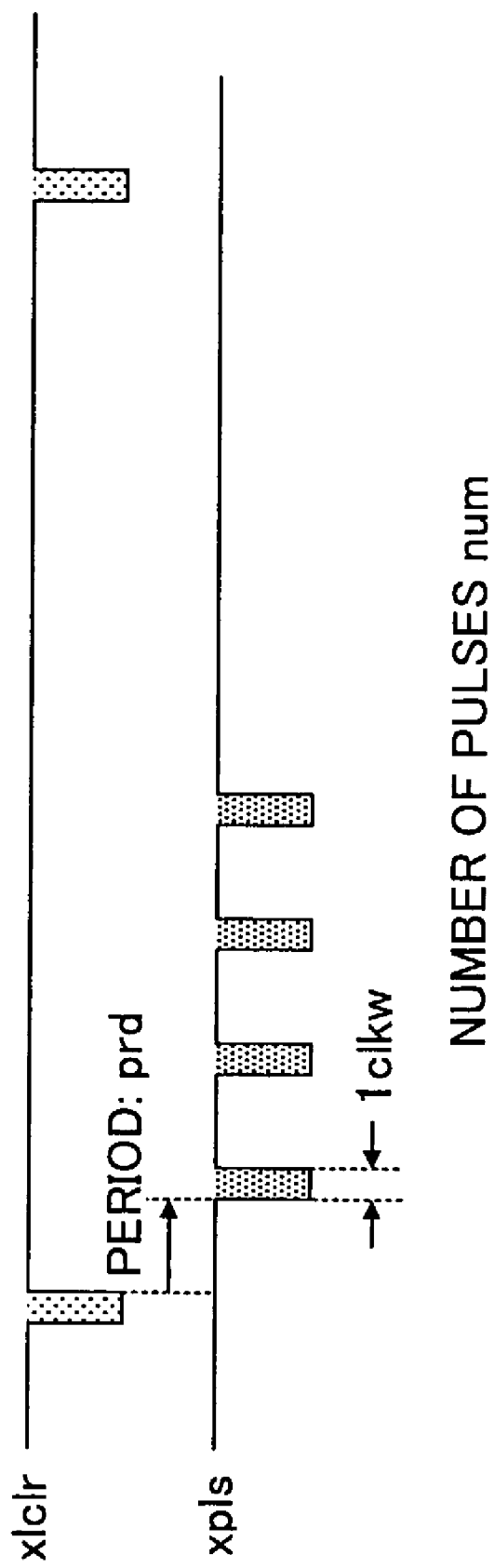
FIG. 22 is a timing chart showing relations among the external pulse sequence generated by the pulse generation unit shown by FIG. 20, a clear signal, and a pulse generation interval (cycle).

Each of the circuit groups $202_1, 202_2, \ldots, 202_{n-1}$, and $202_n$ is constituted by the same components shown by FIG. 20 (namely, a pulse generation unit 99), and performs the same operation as the pulse generating operation shown by FIG. 21, except that the clear signal xclr is replaced with the corresponding area signal. Specifically, the circuit group $202_1$ is provided with the first area signal $area_1$ instead of the clear signal xclr; the circuit group $202_2$ is provided with the second area signal $area_2$ instead of the clear signal xclr; and so on. Further, each of the circuit groups $202_1, 202_2, \ldots, 202_{n-1}$, and $202_n$ is provided with a predetermined pulse generation interval $prd_1, prd_2, \ldots, prd_{n-1}$, and $prd_n$; and a predetermined number of pulses $num_1, num_2, \ldots, num_{n-1}$, and $num_n$.

When any one of the circuit groups $202_1, 202_2, \ldots, 202_{n-1}$, and $202_n$ outputs an external pulse sequence xpls to the OR circuit 203, the pulse external sequence xpls is output from the OR circuit 203 as it is.

Operations of the pulse generation unit 180 constituted in this way are explained in detail with reference to FIG. 5.

The count value k of the counter 200 of the pulse generation unit 180 is reset to 1, when the power supply is turned on.

Then, after the clear signal xlclr is input, the counter 200 increments the count value k, whenever a pixel clock clkw is received. Every time the count value k reaches one of the starting point values of the division periods ($start_1, start_2, \ldots, start_{n-1}$, and $start_n$), the corresponding comparator, which is one of the comparators $201_1, 201_2, \ldots, 201_{n-1}$, and $201_n$, respectively, outputs the corresponding area signal, which is one of the area signals $area_1, area_2, \ldots, area_{n-1}$, and $area_n$, respectively.

When any one of the circuit groups $202_1, 202_2, \ldots, 202_{n-1}$, and $202_n$ receives the corresponding area signal, the operation described as the pulse generating operation carried out by the pulse generation unit 180 is performed. In this case, the count value k of the counter 200 first reaches the first starting point value $start_1$ for the first division period, therefore, the comparator $201_1$ outputs the area signal $area_1$ at the time. Then, the circuit group $202_1$ performs the pulse generating operation using the components shown in FIG. 20, including internal counters 103 and 104, and generates the external pulse sequence xpls for the first division period, and outputs the external pulse sequence xpls via the OR circuit 203.

Then, the count value k of the counter 200 reaches the starting point value of the second division period, and the comparator $201_2$ outputs the area signal $area_2$ at this time. Then, the circuit group $202_2$ performs the pulse generating operation using the components shown in FIG. 20, including the internal counters 103 and 104, generates the external pulse sequence xpls for the second division period, and outputs the external pulse sequence xpls via the OR circuit 203.

The same process is repeated until the last circuit group $202_n$ generates the external pulse sequence xpls for the n-th division period (the last division period), and outputs the external pulse sequence via the by OR circuit 203. In this way, the external pulse sequence (the final external pulse sequence) XPLS finally output via the OR circuit 203 turns into a pulse sequence containing all the external pulse sequences xpls, each corresponding to its respective division period (area), and containing different numbers of pulses for each area, as shown in FIG. 6.

Thus, the pixel clock generation unit 151 including the pulse generation unit 180 carries out a phase change (phase setup) of the pixel clock clkw by dividing a scanning period of the polygon mirrors 5a and 5b into a plurality of division periods (the first through the n-th division periods), and using the final external pulse sequence XPLS containing all the external pulse sequences xpls generated for each of the first division period through the n-th division period.

Accordingly, the optical scanning apparatus that employs the pixel clock generation unit 151 can perform the partial writing scale compensation for the pixel clock clkw using the individual external pulse sequences xpls corresponding to each division period, and produces a high-quality image.

Next, a second example of the structure and operations of a pulse generation unit 181 of the pixel clock generation unit 151 of FIG. 4 is explained with reference to FIG. 7 and FIG. 8.

Figure 7:
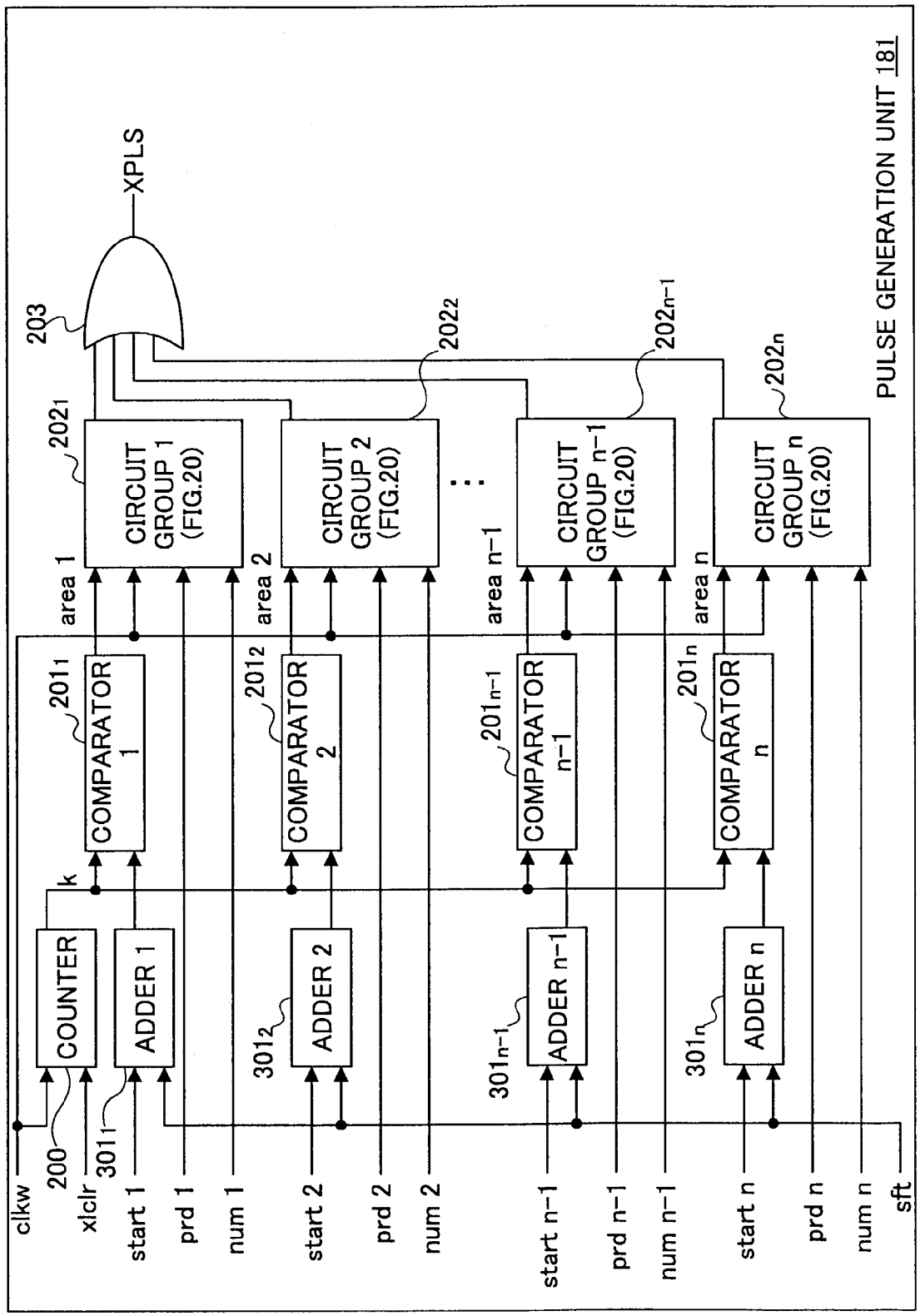
FIG. 7 is a block diagram showing a second example of the structure of the pulse generation unit of the pixel clock generation unit 151 shown by FIG. 4.

FIG. 7 is a block diagram showing the structure of the pulse generation unit 181 in the pixel clock generation unit 151 of FIG. 4, where the same reference marks are given to the same components as shown in FIG. 1, and explanations thereof are not repeated.

Figure 8:
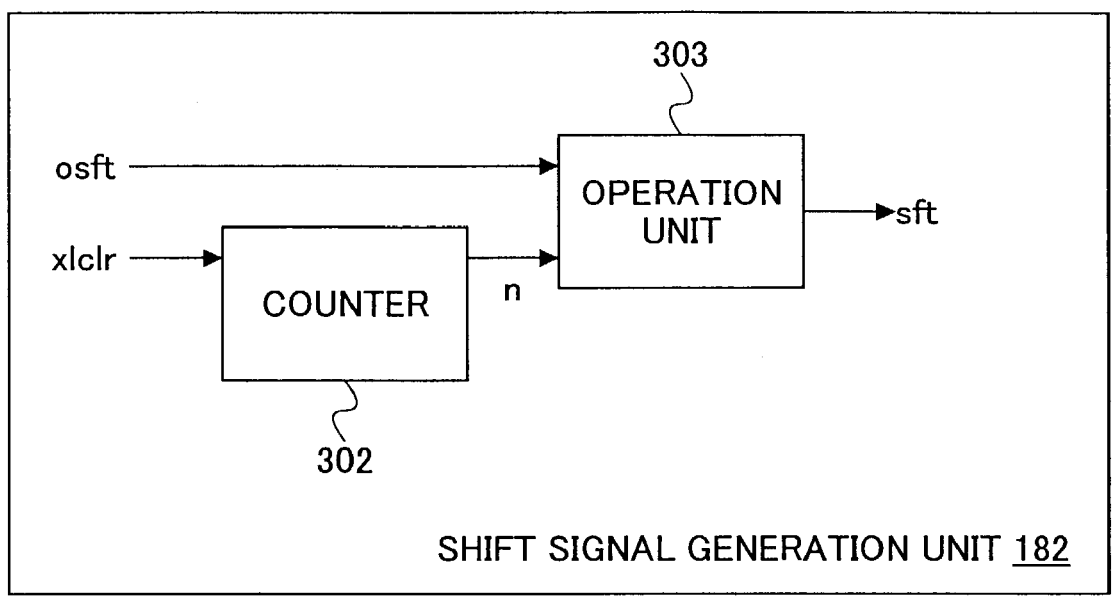
FIG. 8 is a block diagram showing an example of the structure of a shift signal generation unit of the pixel clock generation unit 151 shown by FIG. 4.

FIG. 8 is a block diagram showing the structure of a shift signal generation unit 182 of the pixel clock generation unit 151 of FIG. 4.

The pulse generation units 181 shown in FIG. 7, which is an expansion to the pulse generation unit 180 shown in FIG. 1, additionally includes adders $301_1, 301_2, \ldots, 301_{n-1}$, and $301_n$.

Each of the adders $301_1, 301_2, \ldots, 301_{n-1}$, and $301_n$ adds a value indicated by a shift signal sft input from the shift signal generation unit 182 shown in FIG. 8 to each of the starting point values of the division periods indicated by the start signals $start_1, start_2, \ldots, start_{n-1}$, and $start_n$.

The shift signal generation unit 182 includes a counter 302 and an operation unit 303.

The counter 302 increments a count value n, whenever the clear signal xlclr is input. That is, the counter 302 counts the number of lines in the sub-scanning direction (number of times of the main scanning), and outputs the count value n.

The operation unit 303 carries out an operation process on an initial shift signal osft (initial setting value) that is beforehand input (set up) by the engine CPU (in the main control unit 155) according to the count value n input from the counter 302, and outputs the shift signal sft. The operation unit 303 is explained in detail later.

Here, relations among an xlclr interval (interval between two xlclr pulses), the total value of n division periods (area$_n$, in the present case) and an amount of the shift indicated by the shift signal sft (the amount of the shift being also called sft, here) are assumed to fulfill the following formula 1.

xlclr interval>area$_n$+sft        Formula 1

Therefore, sft is smaller than (xlclr interval−area$_n$).

If a routine is to be prepared, wherein the external pulse sequence xpls of each division period is to be shifted for each line (one scan), and the external pulse sequence xpls of the original division period is to be restored when the routine is performed 4 times, the initial setting value (osft) of the operation unit 303 is set at (xlclr interval−area$_n$)/4.

The operation unit 303 outputs the shift signal sft, whenever the counter 302 increments the count value n. In this example, whenever the counter 302 increments the count value n, a product of the count value n and the initial setting value (osft) is computed. That is, osft is output at the time of the first increment (n=1), 2×osft is output at the time of the second increment (n=2), 3×osft is output at the time of the third increment (n=3), and 4×osft is output at the time of the fourth increment (n=4), as the shift signal sft. When the count value n input from the counter 302 is 5, that is, when the product of the count values n and osft exceeds (xlclr interval−area n), the counter 302 is reset to 0, and the amount of the shift that the shift signal sft indicates is also reset to 0. Henceforth, the above-mentioned operation is repeated.

By operation of the operation unit 303, each of the adders 301$_1$, 301$_2$, ..., 301$_{n-1}$, and 301$_n$ adds the value of the shift signal sft input from the operation unit 303 for every line to the starting point values of the division periods indicated by the start signals start$_1$, start$_2$, ..., start$_{n-1}$, and start$_n$, respectively, and outputs the result to each of the comparators 201$_1$, 201$_2$, ..., 201$_{n-1}$, and 201$_n$, respectively. In this manner, the pulse generation unit 181 generates each of the external pulse sequences xpls, having a phase shifted by the value of the shift signal sft for every line, and outputs them one by one from the OR circuit 203.

Accordingly, the pixel clock-generation unit 151 including the pulse generation unit 181 also makes a phase change to the pixel clock clkw for each of the division periods, which are defined by dividing the scanning period, using the final external pulse sequence XPLS, and provides the partial compensation for the writing scale. Further, since the timing of the phase change can be made different by shifting the phase for every scan of the laser beam, the effect of the compensation for the writing scale is remarkable where a plurality of scanning lines constitute an image. That is, formation of a linear pattern, appearing as a stripe (side effects that are conspicuous within an output image) on an output image (the last image), can be prevented. In this manner, a high-quality image is obtained.

Next, a third example of the structure and operations of a pulse generation unit 183 of the pixel clock generation unit 151 of FIG. 4 is explained with reference to FIG. 9.

Figure 9:
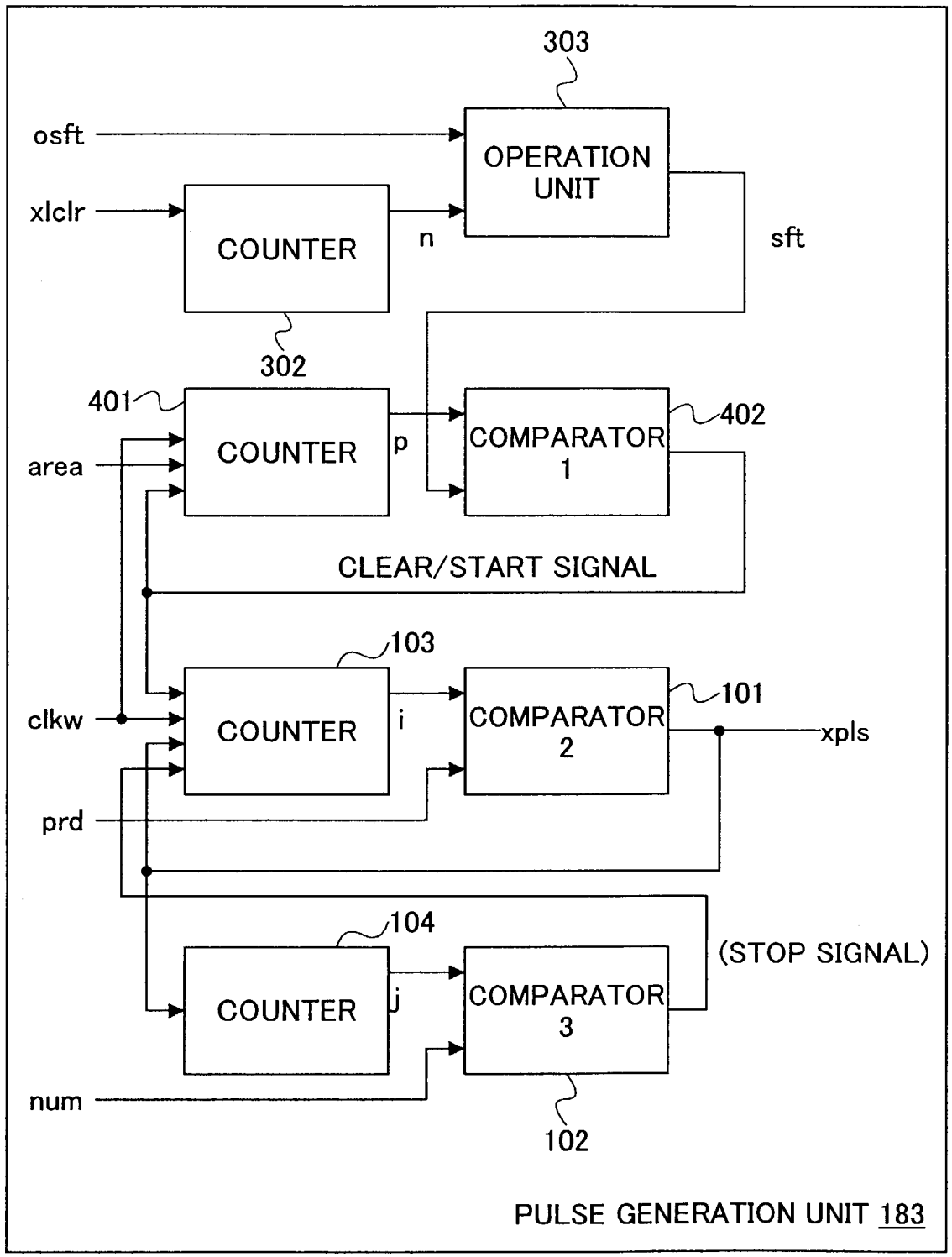
FIG. 9 is a block diagram showing a third example of the structure of the pulse generation unit of the pixel clock generation unit 151 shown by FIG. 4.

FIG. 9 is a block diagram showing the structure of the pulse generation unit 183 of the pixel clock generation unit 151 of FIG. 4, wherein the same reference marks are given to the same components as shown in FIG. 8 and FIG. 20.

In addition to the components shown in FIG. 8 and FIG. 20, the pulse generation unit 183 further includes a counter 401 and a comparator 402.

The pixel clock generation unit 151 outputs an area signal "area", when a count value (the number of pixel clocks) reaches a starting point value (start) supplied by the engine CPU to an internal area signal generation unit (consisting of a counter and a comparator as shown in FIG. 1) that is not illustrated, the starting value indicating a predetermined point in time during the scanning period of the polygon mirrors 5a and 5b.

A counter 401 of the pulse generation unit 183 starts counting the number of the pixel clocks clkw from the time when the area signal "area" is input from the area signal generation unit; and resets a count value p to 0, when a clear-start signal is input from a comparator 402. Henceforth, the same operation is repeated whenever the area signal "area" is input.

The comparator 402 compares the count value p of the counter 401 with the amount (sft) of shifts indicated by the shift signal sft input from the operation unit 303. When the count value p reaches the amount (sft) of shifts, the clear-start signal is output. Since the amount (sft) of shifts changes for every scan as mentioned above, the output timing of the clear-start signal changes.

Operations of the comparators 101 and 102, and the counters 103 and 104 are as explained in reference to FIG. 21, except that the counter 103 starts counting the number of the pixel clocks clkw on the basis of the input time of a clear-start signal.

Accordingly, the external pulse sequences xpls, each of which is shifted by the value of the shift signal sft for every line, can be output only within the scanning period set up beforehand, and the final external pulse XPLS containing the external sequences can be output only within the scanning period set up beforehand.

As described above, the pixel clock generation unit 151, which includes the pulse generation unit 183 and the area signal generation unit, is capable of shifting the output timing of the external pulse sequence xpls within the predetermined period during the scanning period of every scan by the polygon mirrors 5a and 5b, and shifting the timing of a phase change of the pixel clock clkw. In this manner, the timing of the phase change can be made different for every scan so that the same timing does not apply to all the scanning lines.

Further, if the external pulse sequence xpls is generated when scanning positions that separate the image domain and the outside of the image domain, the total number of the external pulse sequences in the scanning period of the image domain changes, and an error arises in the writing scale, resulting in degradation of an output image. According to the present invention, this problem is avoided. That is, the total number of the external pulse sequences in the scanning period of the image domain can be made constant, and degradation of the output image can be suppressed.

An image formation apparatus, which includes the optical scanning apparatus that contains the pixel clock generation unit 151, may be installed with two or more photo conductor drums and optical systems, where precise positioning of the photo conductor drums and the optical systems is required, and a sensor and the like are used to adjust the positioning. In such a case, jitter in the image clock clkw at the sensor position produces positioning errors. Such errors can be removed by the phase control carried out by the pixel clock generation unit 151 mentioned above.

In addition, the circuit groups $202_1, 202_2, \ldots, 202_{n-1}$, and $202_n$ shown in FIG. 1 can be configured by the pulse generation unit 183 shown by FIG. 9. In this case, the circuit groups $202_1, 202_2, \ldots, 202_{n-1}$, and $202_n$ are provided with predetermined pulse generation intervals $prd_1, prd_2, \ldots, prd_{n-1}$, and $prd_n$, respectively; predetermined numbers of pulses $num_1, num_2, \ldots, num_{n-1}$, and $num_n$, respectively; and predetermined initial shift signals (initial setting values) $osft_1, osft_2, \ldots, osft_{n-1}$, and $osft_n$, respectively. Further, the area signals $area_1, area_2, \ldots, area_{n-1}$, and $area_n$ are input to the comparators $201_1, 201_2, \ldots, 201_{n-1}$, and $201_n$, respectively.

Next, a fourth example of the structure and operations of a pulse generation unit 184 of the pixel clock generation unit 151 shown in FIG. 4 is explained with reference to FIG. 10.

Figure 10:
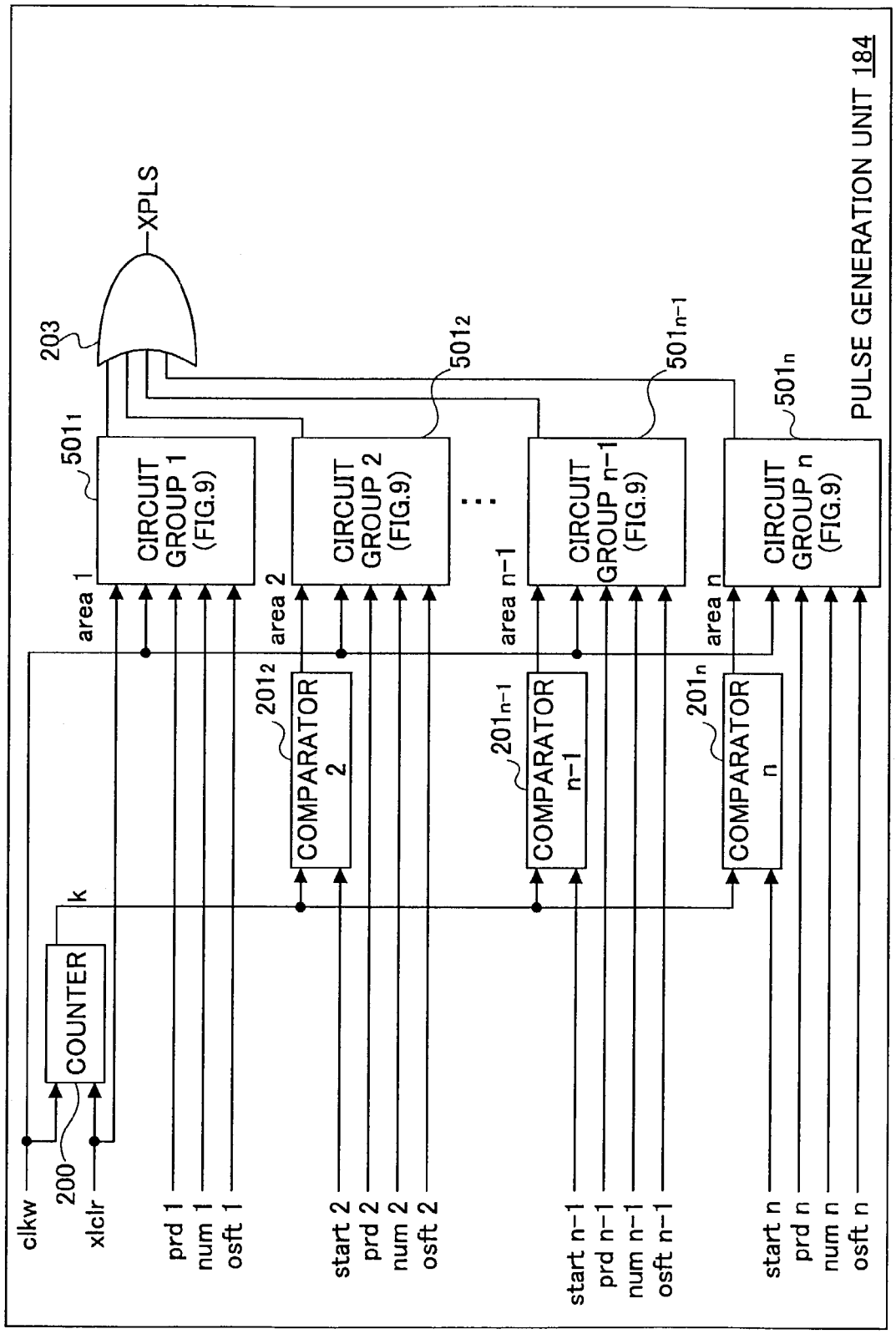
FIG. 10 is a block diagram showing a fourth example of the structure of the pulse generation unit of the pixel clock generation unit 151 shown by FIG. 4.

FIG. 10 is a block diagram showing the structure of the pulse generation unit 184 of the pixel clock generation unit 151 shown in FIG. 4, wherein the same reference marks are given to the same components as FIG. 1 and FIG. 7, and explanations thereof are not repeated.

Circuit groups $501_1, 501_2, \ldots, 501_{n-1}$, and $501_n$ are constituted by the same circuit as the pulse generation unit 183 shown in FIG. 9. Further the circuit groups $501_1, 501_2, \ldots, 501_{n-1}$, and $501_n$ are provided with pulse generation intervals $prd_1, prd_2, \ldots, prd_{n-1}$, and $prd_n$; the number of pulses $num_1, num_2, \ldots, num_{n-1}$, and numn; and the initial setting value $osft_1, osft_2, \ldots, osft_{n-1}$, and $osft_n$, respectively. Further, the clear signal xlclr, serving as the area signal $area_1$, is provided to the circuit group $501_1$. Furthermore, to the circuit groups $501_2, \ldots, 501_{n-1}, 501_n$, area signals $area_2, \ldots, area_{n-1}$, and $area_n$ are provided from the comparators $201_2, \ldots, 201_{n-1}$, and $201_n$, respectively.

Although the pixel clock generation unit 151 including the pulse generation unit 184 serves as phase setting means, which is mainly for the writing scale compensation of an image domain, the clear signal xlclr, serving as the area signal $area_1$, is input to the circuit group $501_1$. This is for fine-tuning the writing start by performing a phase setup within the period before the scan by the polygon mirrors 5a and 5b arrives at the image domain (in this example, the period before the scan by the polygon mirrors 5a and 5b arrives at the image domain is defined as the first scanning period), with the pulse generation unit 184 serving as preparatory phase setting means.

The pulse generation unit 184 generates the external pulse sequence xpls based on the pulse generation interval $prd_1$ and the number of pulses $num_1$, which are preset to the circuit group $501_1$ (equivalent to the pulse generation unit 183 of FIG. 9) before the scan by polygon mirrors 5a and 5b arrives at the image domain. In this manner, the writing start can be fine-tuned with a resolution smaller than one dot. In other words, the position (registration) of the image in the main scanning direction can be fine-tuned according to the pulse generation interval $prd_1$ and the number of pulses $num_1$.

Further, the pixel clock generation unit 151 including the pulse generation unit 184 is capable of providing different timings of the phase change of the pixel clock clkw. This is carried out by dividing a scanning period of the polygon mirrors 5a and 5b into a plurality of division periods, and by changing the output timing of the external pulse xpls within each division period (except for the first scanning period) for every scan by the circuit groups $501_2, \ldots, 501_{n-1}$, and $501_n$ (equivalent to the pulse generation unit 183 of FIG. 9).

Therefore, the external pulse sequence xpls is not generated during the scan of the boundary position that separates the image domain from the outside of the image domain. If an external pulse sequence xpls is generated at the boundary position, the total number of the external pulse sequences in the scanning period of the image domain changes, a minute error in writing scale arises as a result, and degradation of an output image occurs. That is, according to the present invention, the total number of the external pulse sequences in the scanning period of the image domain is made a constant, and degradation of the output image is suppressed.

An image formation apparatus carrying the optical scanning apparatus that has the pixel clock generation unit 151 may have two or more photo conductor drums and optical systems. In such a case, accurate positioning of the photo conductor drums and the optical systems is required, and a sensor and the like are used to adjust the positioning. In such a case, jitter in the image clock clkw at the sensor position produces positioning errors. Such errors can be removed by the phase control carried out by the pixel clock generation unit 151 mentioned above.

Next, a fifth example of the structure and operations of a pulse generation unit 185 of the pixel clock generation unit 151 of FIG. 4 is explained with reference to FIG. 11 and FIG. 12.

Figure 11:
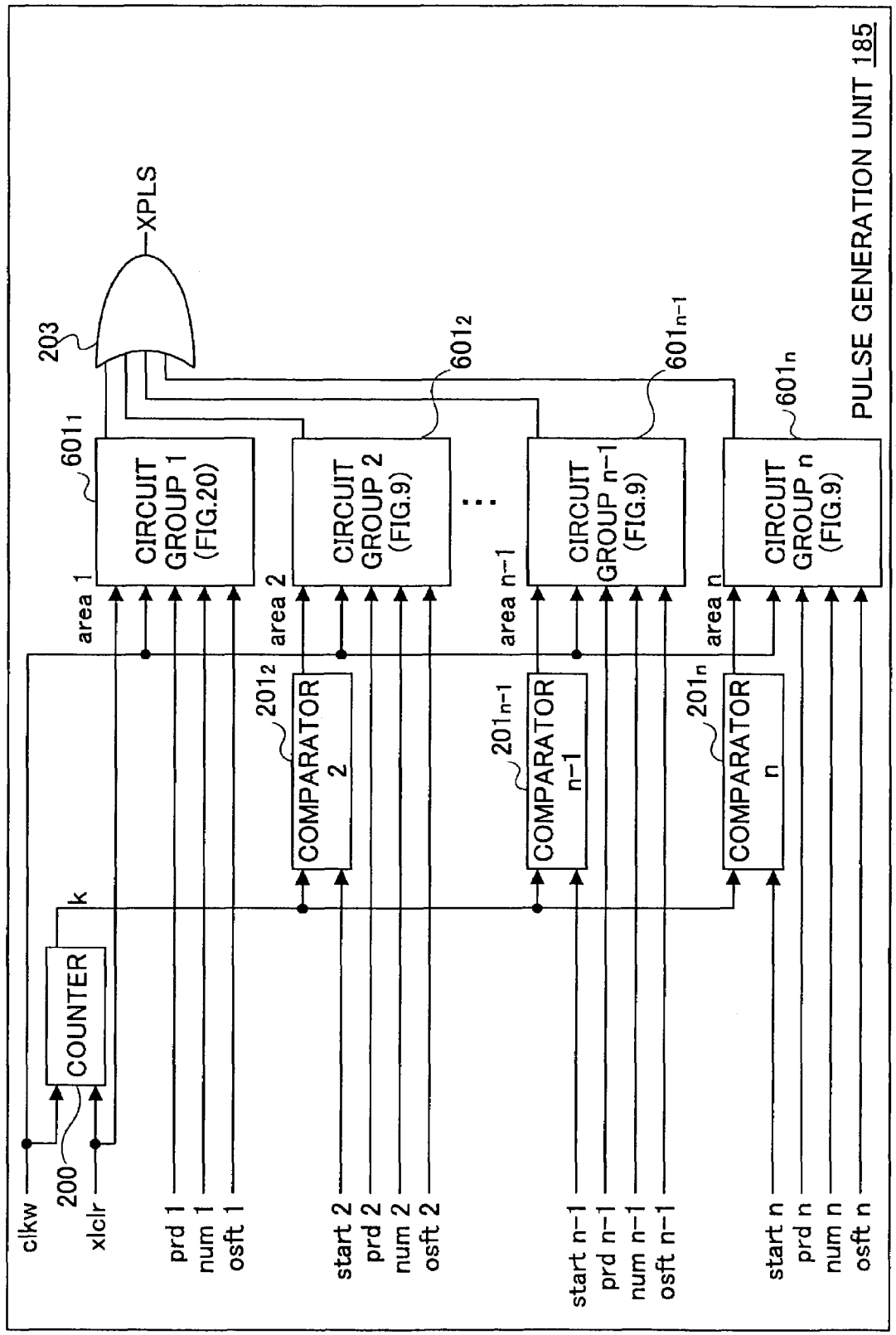
FIG. 11 is a block diagram showing a fifth example of the structure of the pulse generation unit of the pixel clock generation unit 151 shown by FIG. 4.

FIG. 11 is a block diagram showing the structure of the pulse generation unit 185 of the pixel clock generation unit 151 of FIG. 4, wherein the same reference marks are given to the same components as FIG. 1, FIG. 7, and FIG. 10, and explanations thereof are not repeated.

Figure 12:
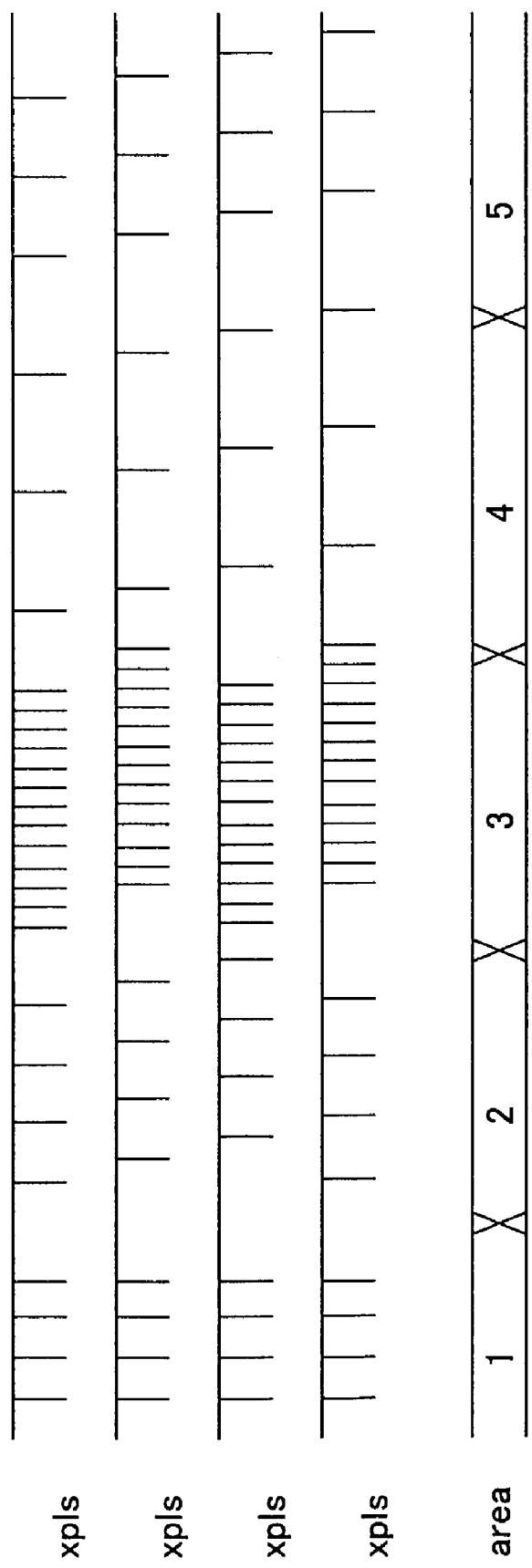
FIG. 12 is a timing chart showing relations between the external pulse sequence generated by the pulse generation unit shown by FIG. 11 and each scanning period.

FIG. 12 is a timing chart that shows relations between the external pulse sequence xpls generated by the pulse generation unit 185 shown in FIG. 11, and each scanning period (area).

The pulse generation unit 185 shown in FIG. 11 includes a circuit group $601_1$ that is constituted by a pulse generation unit 99 that is the same as FIG. 20; and circuit groups $601_2, \ldots, 601_{n-1}$, and $601_n$, each of which is constituted by a pulse generation unit 183 that is the same as FIG. 9. Here, all the circuit groups $601_1, 601_2, \ldots, 601_{n-1}$, and $601_n$ are beforehand provided with pulse generation intervals $prd_1, prd_2, \ldots, prd_{n-1}$, and $prd_n$; the number of pulses $num_1, num_2, \ldots, num_{n-1}, num_n$; and the initial setting values $osft_1, osft_2, \ldots, osft_{n-1}$, and $osft_n$, respectively. Further, the circuit group $601_1$ is provided with the clear signal xlclr as the area signal areal; and the circuit groups $601_2, \ldots, 601_{n-1}$, and $601_n$ are provided with area signals $area_2, \ldots, area_{n-1}$, and $area_n$, respectively, by the comparators $201_2, \ldots, 201_{n-1}$, and $201_n$, respectively.

Although the main purpose of providing the pixel clock generation unit 151 including the pulse generation unit 185, which serves as phase setting means, is to obtain a writing scale compensation of the image domain, the clear signal xlclr is provided to the circuit group $601_1$ as the area signal $area_1$. This is because it is not necessary to change the timing of a phase change of the pixel clock clkw within the period before the scan by the laser beam arrives at the image domain. In the case of the pixel clock generation unit 151, the structure of the circuit group $601_1$ is made simple by using the pulse generation unit 99 that is the same as shown by FIG. 20, instead of the complicated structure of the pulse generation unit 183 as shown by FIG. 9 (in this example, the period before the scan by the polygon mirrors 5a and 5b arrives at the image domain is defined as the first scanning period). Accordingly, the circuit scale corresponding to the first scanning period that is an unnecessary part is reduced, and an optimization of design is available.

Further, the pixel clock generation unit 151 is capable of changing the timing of a phase change of the pixel clock clkw. This is carried out by dividing a scanning period of the polygon mirrors 5a and 5b into a plurality of division periods, and by changing the output timing of the external pulse sequence xpls within each-of the division periods (except for the first division period) for every scan by the circuit groups $601_2, \ldots, 601_{n-1}$, and $601_1$ (equivalent to the pulse generation unit 183 shown in FIG. 9).

As shown in FIG. 12, the final external pulse sequence XPLS output from the OR circuit 203 contains the external pulse sequences xpls, each of which consists of a different number of pulses for every division period, wherein the output timing of the external pulse sequences xpls randomly differs within each division period for every scan, except for the first division period.

Accordingly, the external pulse sequence xpls is not generated during the scan of the boundary position that separates the image domain from the outside of the image domain. If an external pulse sequence xpls is generated while scanning the boundary position, the total number of the external pulse sequences in the scanning period of the image domain changes, an error arises in the writing scale as the result, and degradation of an output image occurs. In other words, the total number of the external pulse sequences in the scanning period of the image domain is made constant according to the present invention, and degradation of an output image is suppressed.

The image formation apparatus equipped with the optical scanning apparatus that includes the pixel clock generation unit 151 may have two or more photo conductor drums and optical systems, where accurate positioning of the photo conductor drums and the optical systems is required, and a sensor and the like are used to adjust the positioning. In such a case, jitter in the image clock clkw at the sensor position produces positioning errors. Such errors can be removed by the phase control carried out by the pixel clock generation unit 151 mentioned above.

In addition, a desired combination of the pulse generation units as described above may be included in the pixel clock generation unit 151.

Figure 13:
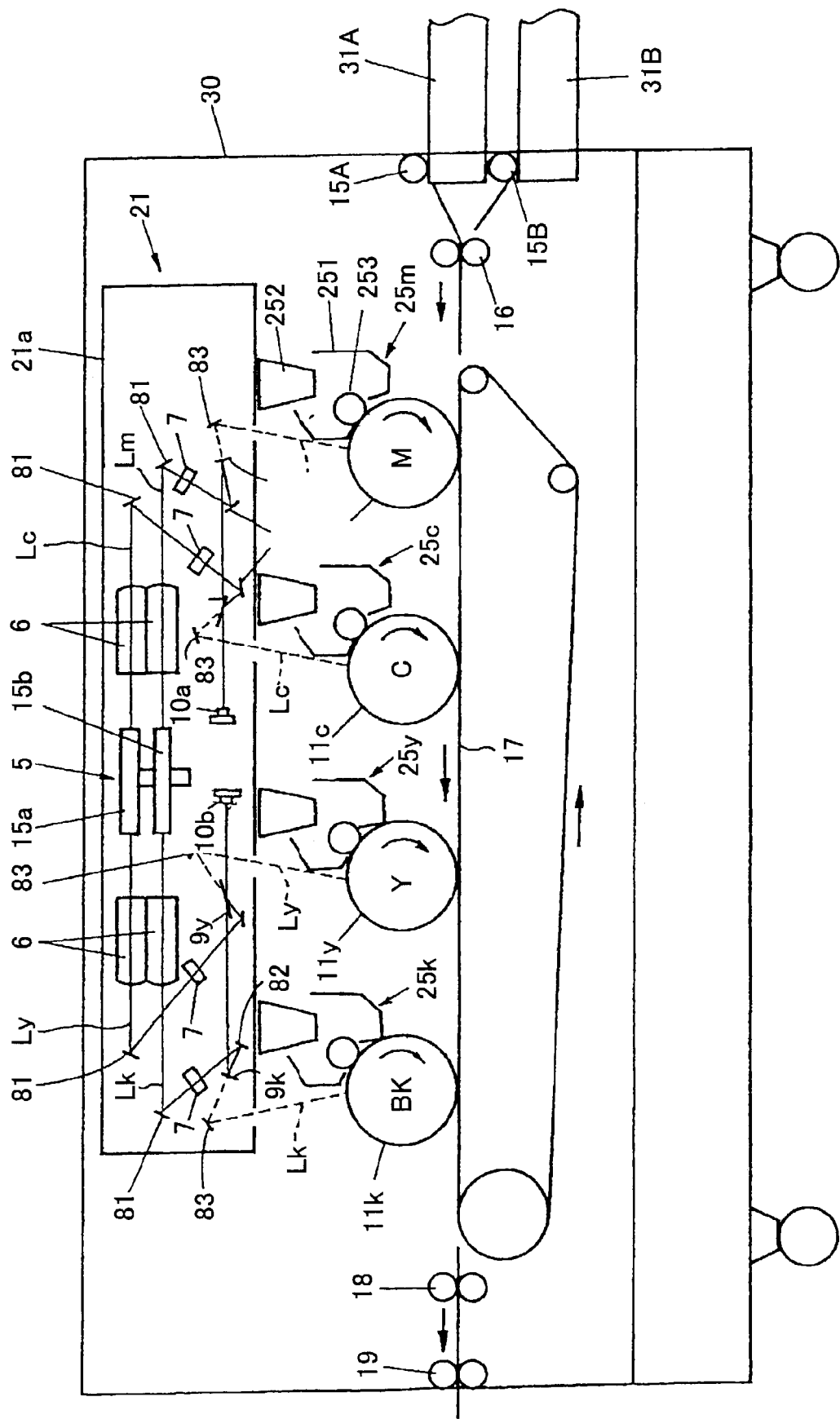
FIG. 13 is a schematic figure showing an outline of the structure of an embodiment of the image formation apparatus of the present invention.

Next, an embodiment of an image formation apparatus of the present invention, using the electronic photographing method, is explained with reference to FIG. 13. FIG. 13 is a schematic diagram showing the outline of the internal structure of the image formation apparatus.

The image formation apparatus is a color laser printer including the optical scanning apparatus described above such that an image is formed using the optical scanning apparatus. The color laser printer includes two feed cassettes 31A and 31B attached to a cabinet 30. The cabinet 30 includes feed rollers 15A and 15B that load paper stored in the feed cassettes 31A and 31B, where the size of the paper stored in the feed cassette 31A may be different from paper stored in the feed cassette 31B, and one sheet of the paper is fed at a time from the top of the stored paper. The cabinet 30 further includes a conveyance roller pair 16 for transporting the paper to the cabinet 30, a conveyance belt 17 for transferring an image to the paper, a fixing roller pair 18 for fixing the transferred image, and a delivery roller pair 19, all the items listed here being arranged so that the paper is transported almost horizontally.

Further, four photo conductor drums 11m, 11c, 11y, and 11k for forming the image in colors magenta (M), cyan (C), yellow (Y), and black (BK), respectively, are provided on the conveyance belt 17 along the transport direction of the paper, each drum serving as a scanned medium. Each of the photo conductor drums 11m, 11c, 11y, and 11k rotates in the direction as indicated by the arrows associated with the photo conductor drums 11m, 11c, 11y, and 11k shown in FIG. 13.

Furthermore, an optical scanning apparatus 21 is arranged above the photo conductor drums 11m, 11c, 11y, and 11k. The optical scanning apparatus 21 is the optical scanning apparatus (including the pixel clock generation unit 151 that further includes the pulse generation units or a desired combination thereof) as explained with reference to FIG. 2 and FIG. 3, and is contained in a case 21a with the rotating deflection unit 5 and all the optical components. The same reference marks are given to the same components as in FIG. 2 and FIG. 3, and explanations thereof are not repeated.

Then, the four laser beams Lm, Lc, Ly, and Lk are irradiated to the target scanning surfaces of the photo conductor drums 11m, 11c, 11y, and 11k, respectively, the drums being charged by an electrification charger (electrification unit) that is not illustrated, through four windows prepared in the undersurface of the case 21a, and an electrostatic latent image is produced.

Development units 25m, 25c, 25y, and 25k that contain magenta, cyan, yellow, and black development agents, respectively, are provided on the down stream side in the rotation direction from the scanning position by the laser beam of each of the photo conductor drums 11m, 11c, 11y, and 11k. Each of the development units includes a unit case 251, a development agent (toner) cartridge 252, and a development roller 253. The reference numbers 251, 252 and 253 are given only in association with the photo conductor drum 11m, and omitted in association with the other drums for drawing convenience.

Furthermore, a transfer roller is prepared for each of the photo conductor drums 11m, 11c, 11y, and 11k on the other side of the conveyance belt 17, and at a countering position. Further, a cleaning unit is prepared on the down stream side of the transfer position of each photo conductor drum. Like the electrification charger, the transfer roller and the cleaning unit are publicly well-known matters, and illustration thereof is omitted.

The latent images formed on the scanning target surface of the photo conductor drums 11m, 11c, 11y, and 11k by scanning the laser beams Lm, Lc, Ly, and Lk, respectively, are developed by the magenta, cyan, yellow, and black development agents (toner) of the development units 25m, 25c, 25y, and 25k, respectively, and the images are thereby made visible.

The images developed in this manner are transferred one by one onto a stack on the same paper that is transported by the conveyance belt 17 in the direction indicated by the arrows associated with the conveyance belt 17. In this manner, a full color image is formed on the paper. The full color image is fixed to the paper by the fixing roller pair 18, and the paper is discharged outside the image formation apparatus by the delivery roller pair 19.

In summary, the paper is fed from the feed tray 15a or 15b, transported leftward (as shown in FIG. 13) by the conveyance belt 17, printed with an image by the photo conductor drums 11m, 11c, 11y, and 11k in respective colors one by one, heated, pressed and fixed with the full color image by the fixing roller pair 18, and discharged by the delivery roller pair 19.

Since the optical scanning apparatus 21 structured according to the present invention can be made smaller and less expensively than conventionally, an image formation apparatus can be made smaller and less expensively by using the optical scanning apparatus 21 as image producing means as described above.

Figure 14:
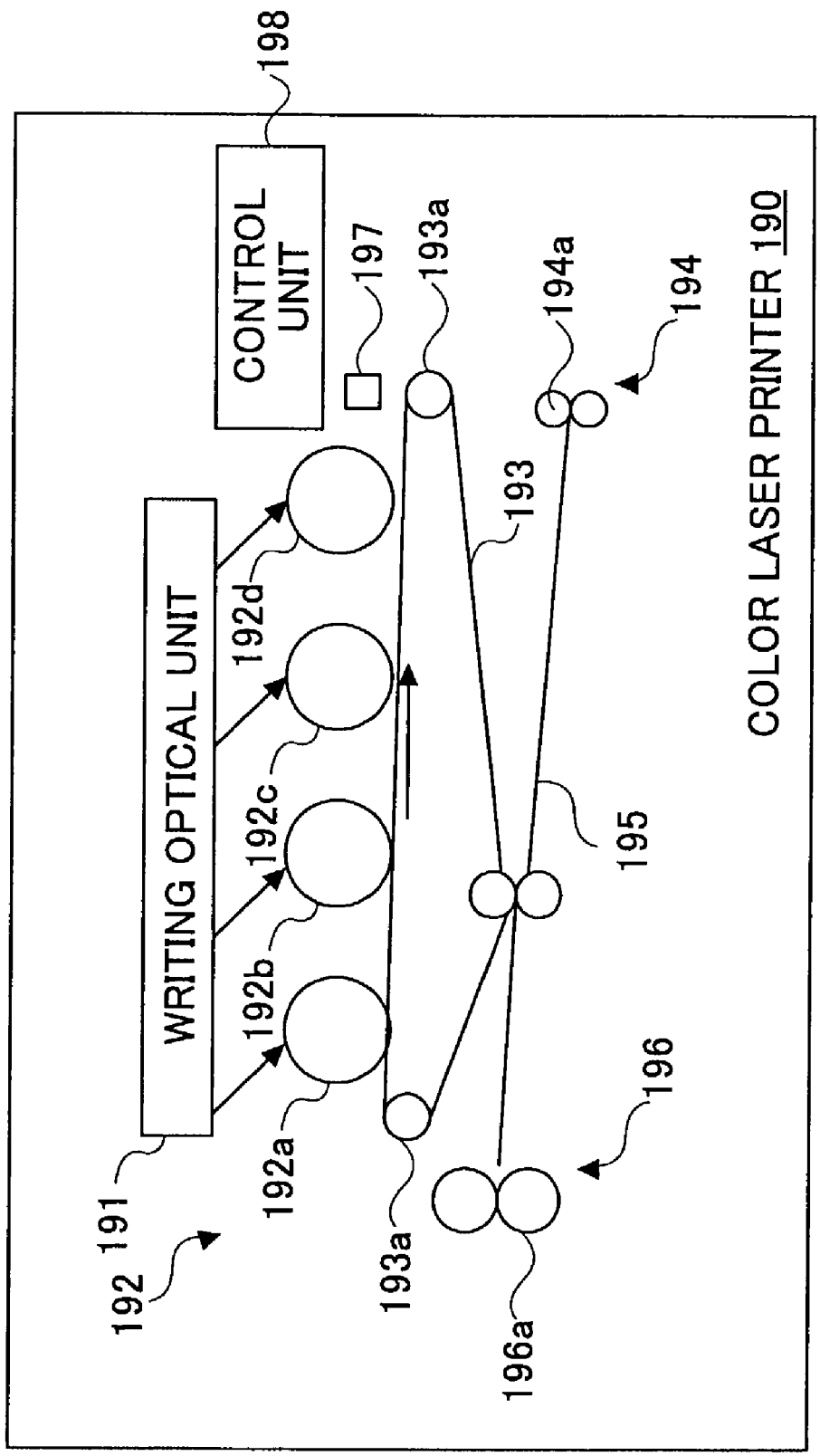
FIG. 14 is a schematic figure showing an outline of the structure of another embodiment of the image formation apparatus of the present invention.

Next, a color laser printer 190 shown in FIG. 14 is explained, which is another embodiment of the present invention. The color laser printer described above contains the pixel clock generation unit, which serves phase setting means, in the optical scanning apparatus. Conversely, the color laser printer 190 described here does not contain the pulse generation unit in the optical scanning apparatus, but in a control unit 198 of the color laser printer 190.

The color laser printer 190 is provided with a 4-stage tandem structure, wherein a set of an optical writing system and an image support object is provided for each of the four colors. The color laser printer 190 includes an optical writing unit 191, a photo conductor drum 192, a middle transfer belt 193, a feed unit 194, a conveyance unit 195, a fixing unit 196, and a position detection sensor 197, in addition to the control unit 198.

The optical writing unit 191 periodically deflects each laser beam output from four laser light sources by a polygon mirror, like the optical scanning apparatus mentioned above. The target scanning surface of the photo conductor drum 192 (specifically, photo conductor drums 192a, 192b, 192c, and 192d) is scanned by the laser beams in a main scanning direction, and moves (rotates) in a sub-scanning direction. The optical writing unit 191, which serves as optical scanning means, produces an electrostatic latent image on the target scanning surface. The optical writing unit 191, which also serves as pattern formation means, forms a displacement amount detection pattern 290 for detecting the displacement amount of positions of the images, the displacement amount detection pattern 290 being formed on the middle transfer belt 193. The photo conductor drum 192 includes photo conductor drums 192a, 192b, 192c, and 192d for forming an image in colors of magenta (M), cyan (C), yellow (Y), and black (BK), respectively. In addition, although illustration is omitted, an electric discharge unit, an electrification unit, and a development unit are attached to each of the photo conductor drums 192a, 192b, 192c, and 192d.

The middle transfer belt 193 is installed around rollers 193a, and carries out circumferential movement driven by the rotational movement of the rollers 193a. Further, the displacement amount detection pattern 290 is formed on the middle transfer belt 193, which will be described later. A pair of registration rollers 194a constitutes a feed unit 194 that feeds paper from a paper feed tray that is not illustrated, and temporarily stops feeding the paper. The registration roller pair 194a re-feeds the paper after timing is taken so that the leading tip part of the image of each color may arrive at a predetermined transfer position. The conveyance unit 195 transports the paper, which has a full color image transferred, to the fixing unit 196. The fixing unit 196 fixes the full color image to the paper by a fixing roller pair 196a. A position detection sensor 197 detects the displacement amount detection pattern 290 formed on the middle transfer belt 193, the details of which will be explained later. The control unit 198 controls overall operations of the color laser printer 190, and includes the pixel clock generation unit 151, the phase sync unit 152, the laser driving unit 153, the polygon motor driving unit 154, and the main control unit 155.

The color laser printer 190 operates as follows. First, a beam spot with a predetermined diameter is formed on the surface of the photo conductor drums 192a 192b, 192c, and 192d rotating in the sub-scanning direction, with the optical writing unit 191 irradiating the four laser beams. In this manner, electrostatic latent images in each color of magenta, cyan, yellow, and black are formed. The electrostatic latent images in each color are developed by the respective development unit by toner in the respective color. Then, toner images in magenta, cyan, yellow, and black are formed on the surface of the photo conductor drums 192a, 192b, 192c, and 192d, respectively.

In parallel to this, the middle transfer belt 193 is carrying out circumferential movement with rotation of the rollers 193a, paper feeding is carried out, and the paper stops at the registration roller pair 194a. Then, timing is taken and the paper is re-fed so that the leading tip part of the image of each color may arrive at the predetermined transfer position. The toner image in each color is transferred one by one to the paper that is re-fed by the electrostatic power of the transfer roller (not illustrated) for each color. In this manner, the full color image of a 4-color stack is obtained. The paper on which the toner images are transferred is transported to the fixing unit 196, and the paper is delivered after the fixing roller pair 196a fixes the full color image on the paper.

Now, in the case of a tandem type color laser printer like the color laser printer 190, an image in each color is formed by independent optical writing systems (optical writing units 191) on respective image supporting objects (photo conductor drum 192), therefore, it is important to carry out accurate positioning of each color so that a color displacement does not occur. For this reason, in order that the color laser printer 190 detects an amount of position displacements between the images in each color, the optical writing unit 191 carries out detection of the displacements, and produces the amount detection pattern 290 of the position displacements on the middle transfer belt 193.

Figure 15:
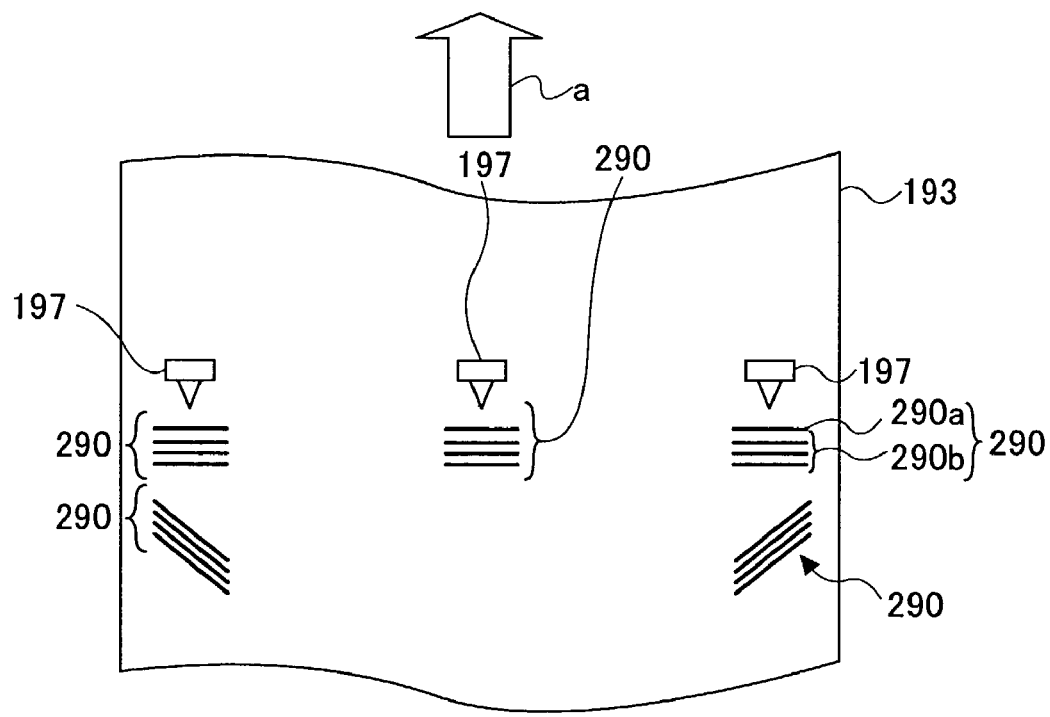
FIG. 15 shows arrangement relations of a position detection sensor with a middle transfer belt of the image formation apparatus shown by FIG. 14.

The displacement amount detection pattern 290 is formed in three places as shown in FIG. 15, namely, on the left hand side, in the center and on the right hand side of the middle transfer belt 193 along the moving direction "a" (the sub-scanning direction) as the middle transfer belt 193 rotates. Here, a standard color is selected, which is black in the following explanation. (Any one of the four colors can serve as the standard color.) The displacement amount detection pattern 290 is formed in the standard color, and consists of a standard color patch 290a and non-standard color patches 290b, each patch being formed as a stripe, and being arranged at a shifted position. The non-standard color patches 290b specify the image formation position of the non-standard colors (i.e., cyan, magenta, and yellow, in this example). The position detection sensor 197 detects light reflected from the standard color patch 290a and the non-standard color patches 290b, calculates the amount of position displacements of each color that is inherent in image formation (pattern formation) from the detection result, and the position displacements are rectified based on the calculated values.

In the present example, three position detection sensors 197 are provided for each displacement amount detection pattern in order to attain higher accuracy. However, the number of the position detection sensors is not limited to three, and only one detection sensor many be provided. For example, only one displacement detection pattern may be provided on the right hand side of the middle transfer belt 193, and only one corresponding position detection sensor 197 may be installed.

Figure 16:
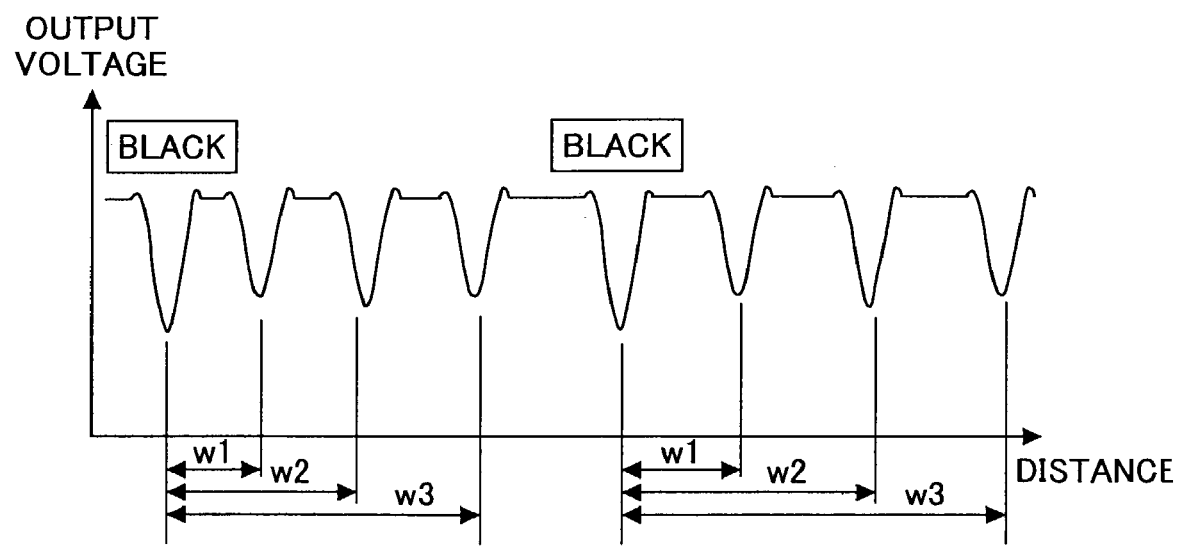
FIG. 16 is a schematic figure showing a graph of a typical output waveform of the position detection sensor.

FIG. 16 is a graph that shows a typical output waveform of the position detection sensor 197. The output of the position detection sensor 197 forms a valley where an output (voltage) falls sharply, where the standard color patch and the non-standard color patches are detected. The amount of position displacements is computed by measuring the distances from the standard color patch 290a to each of the non-standard color patches 290b, namely, the distances w1, w2, and w3, respectively.

In the case of the color laser printer 190, the pulse generation unit (for example, the pulse generation unit 180) is contained in the control unit 198, which outputs the external pulse sequence XPLS for each division period for changing the phase of the pixel clock. Here, if outputting of the external pulse sequence XPLS and formation of the displacement amount detection pattern 290 are carried out without regard to reading operations of the position detection sensor 197, an undesired result occurs. Specifically, for example, if the external pulse sequence XPLS is output when forming the displacement amount detection pattern 290, the phase of the pixel clock is changed in response to the influence of the output of the external pulse sequence XPLS, and the shape of the displacement amount detection pattern 290 will be disturbed, causing the standard color patch 290a and the non-standard color patches 290b to be deformed. Further, even if the displacement amount detection pattern 290 is correctly shaped, if the external pulse XPLS is output when reading the displacement amount detection pattern 290, an error will arise in reading by the position detection sensor 197, and reading accuracy will be degraded.

In this case, the output of the position detection sensor 197 when reading the displacement amount detection pattern 290 will become unstable. For this reason, the external pulse sequence XPLS does not contain expected pulse shifts, with the value measured from the displacement amount detection pattern 290 by the position detection sensor 197 not being fed back properly. In this case, convergence to an optimum value does not occur, even if a large number of measurements are carried out.

Then, in order to avoid situations like the above, the pulse generation unit included in the control unit 198 controls the color laser printer 190 such that the pattern formation timing for forming the displacement amount detection pattern 290 does not overlap with the phase setting timing for outputting the external pulse sequence XPLS for changing the phase. Further, the pulse generation unit included in the control unit 198 also controls such that the detection timing of the displacement amount detection pattern 290 by the position detection sensor 197 does not overlap with the phase setting timing.

By controlling as above, the formation of the displacement amount detection pattern 290, and the detection by the position detection sensor 197 are performed at a timing different from the output timing of the external pulse sequence XPLS. In this manner, the displacement amount detection pattern 290 is formed correctly with no disorder; and the reading is stabilized without error, and performed with sufficient accuracy.

In the following, more details of the control are explained.

Figure 17:
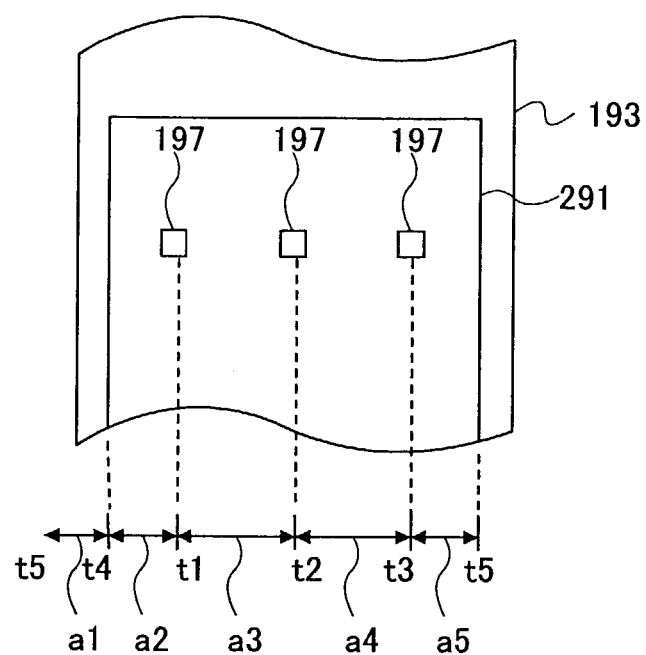
FIG. 17 shows relations between arrangement of the position detection sensor and output timing of the external pulse sequence.

FIG. 17 shows relations between the arrangement of the position detection sensor 197 and the output timing of the external pulse sequence XPLS. In FIG. 17, an image 291 in A3 size is assumed to be formed on the middle transfer belt 193.

In order that the external pulse sequence XPLS not be output at the detection timing of each position detection sensor 197 detecting the light reflected from each displacement amount detection pattern 290, the color laser printer 190 sets each detection timing as phase setting prohibition timing, and the external pulse sequence XPLS is made to be output between detection timings for each position detection sensor 197. That is, the color laser printer 190 sets up pulse output domains a1, a2, a3, a4, and a5, and the external pulse sequence XPLS is output only during the pulse output domains for carrying out the phase change. Details follow.

In the case of the color laser printer 190, detection timings of each position detection sensor 197 in a scanning period are set as t1, t2, and t3, the scanning period being defined as starting at timing t4, and ending at timing t5. As shown in FIG. 17, the output domains (pulse output domains) a1, a2, a3, a4, and a5 for the external pulse sequence XPLS to be output are defined where the detection timings t1, t2, and t3 are not defined. Specifically, in the present example, a1 is defined between the preceding t5 and t4; a2 is defined between t4 and t1; a3 is defined between t1 and t2; and a3 is defined between t3 and t5. In this manner, the external pulse sequence XPLS is output only when each position detection sensor 197 is not carrying out the detection, thus enabling the position detection sensor 197 to read the displacement amount detection pattern 290 with stability and without being affected by the phase change, and realizing high quality positioning.

Figure 18:
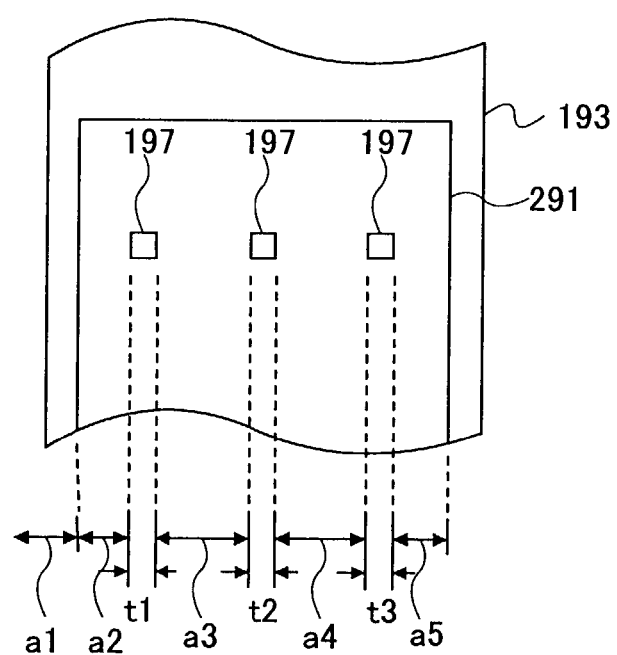
FIG. 18 shows another case of the relations between the arrangement of the position detection sensor and the output timing of the external pulse sequence.
Figure 19:
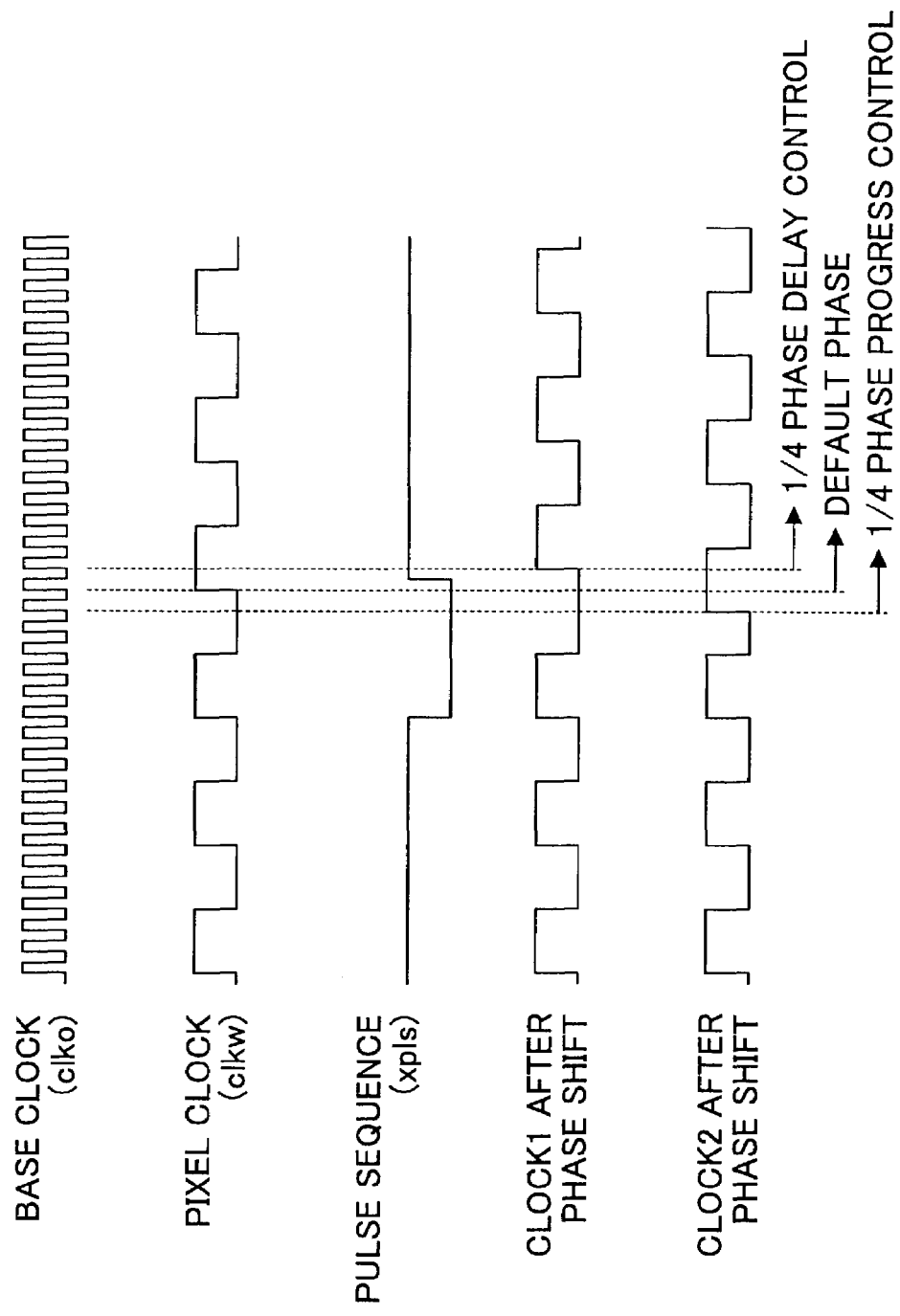
FIG. 19 is a timing chart showing an example of relations between the pixel clock generated by the pixel clock generation unit conventionally used by an optical scanning apparatus, and its phase change.

Here, it is considered that a spot light source that each position detection sensor 197 detects is not a pin point light source the magnitude of which is negligible, but the spot light source has a certain magnitude. Therefore, the detection timings t1, t2, and t3 are desirably set up with a range, corresponding to the irradiation range of the beam spot by the laser beam. That is, instead of the detection timings t1, t2, and t3, detection periods (phase setting prohibition periods) T1, T2, and T3 are defined, wherein the phase setting is prohibited. Accordingly, the pulse output domains a1, a2, a3, a4, and a5 are set up where the detection periods T1, T2, and T3 are not defined as shown in FIG. 18. Since the external pulse sequence XPLS is no longer output during the detection period of each position detection sensor 197, the phase compensation is not carried out during the detection period. In this manner, reading performances of the position detection sensor 197 are stabilized, the displacement amount of position is detected correctly, and high quality positioning is performed.

Since the pulse output domains a1, a2, a3, a4, and a5 are set up in consideration of the magnitude of the spot light source in this case, operations of the position detection sensor 197 are further stabilized, and the displacement amount is more accurately detected.

Further, the pulse interval of the external pulse sequence xpls is changed for every pulse output domain by the color laser printer 190, when changing a phase of each pulse output in the pulse output domain, as mentioned above. For example, as shown in FIG. 6, the pulse interval of the pulse output domain a3 is made finer than other pulse output domains, and the pulse intervals of the pulse output domains a2, a1, a5, and a4 are made coarser one by one in this order. By carrying out a process like this, the amount of the pulse change is individually set up for every pulse output domain of a scanning period, and the partial compensation of the writing scale is performed. In this manner, formation of a high quality image is made possible.

Here, it cannot be overemphasized that the present invention is applicable to other image formation apparatuses that form an image using an optical scanning apparatus using a laser beam, such as copying apparatuses, facsimile apparatuses, etc., other than color laser printers, although the above explanation is made about color laser printers.

Since the partial compensation of the writing scale can be performed to a pixel clock according to the optical scanning apparatus and the image formation apparatus therewith of the present invention, as explained above, image quality can be raised. Further, the optical scanning apparatus and the image formation apparatus therewith can also be made at low cost.

Further, the present invention is not limited to these embodiments, but variations and modifications may be made without departing from the scope of the present invention.

The present application is based on Japanese priority application No. 2002-114791 filed on Apr. 17, 2002 with the Japanese Patent Office, the entire contents of which are hereby incorporated by reference.

What is claimed is:

1. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
   a sync detection sensor for generating and outputting a sync detection signal that specifies a writing start position of the laser beam in the main scanning direction by detecting the laser beam at a place that is outside of an image domain of the target scanning surface in the main scanning direction,
   a pixel clock generation unit for generating and outputting a pixel clock that is synchronized with the sync detection signal that is output by the sync detection sensor, and
   a phase setting unit for changing a phase of the pixel clock output for each of a plurality of division periods that are formed by dividing a scanning period of the laser beam,
   wherein the phase setting unit is capable of carrying out a partial phase change that changes the phase in a time period shorter than one cycle of the pixel clock.

2. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
   a sync detection sensor for generating and outputting a sync detection signal that specifies a writing start position of the laser beam in the main scanning direction by detecting the laser beam at a place that is outside of an image domain of the target scanning surface in the main scanning direction,
   a pixel clock generation unit for generating and outputting a pixel clock that is synchronized with the sync detection signal that is output by the sync detection sensor, and
   a phase setting unit for changing a phase of the pixel clock output for each of a plurality of division periods that are formed by dividing a scanning period of the laser beam,
   wherein the phase setting unit is capable of changing a timing of the phase setup for each of the division periods, for each scan of the laser beam.

3. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
   a sync detection sensor for generating and outputting a sync detection signal that specifies a writing start position of the laser beam in the main scanning direction by detecting the laser beam at a place that is outside of an image domain of the target scanning surface in the main scanning direction,
   a pixel clock generation unit for generating and outputting a pixel clock that is synchronized with the sync detection signal that is output by the sync detection sensor, and
   a phase setting unit for changing a phase of the pixel clock output during a predetermined period within a scanning cycle of the laser beam,
   wherein the phase setting unit is capable of carrying out a partial phase change that changes the phase in a time period shorter than one cycle of the pixel clock.

4. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
   a sync detection sensor for generating and outputting a sync detection signal that specifies a writing start position of the laser beam in the main scanning direction by detecting the laser beam at a place that is outside of an image domain of the target scanning surface in the main scanning direction,
   a pixel clock generation unit for generating and outputting a pixel clock that is synchronized with the sync detection signal that is output by the sync detection sensor, and
   a phase setting unit for changing a phase of the pixel clock output during a predetermined period within a scanning cycle of the laser beam,
   wherein the phase setting unit is capable of changing a timing of the phase setup during the predetermined period, for each scan of the laser beam.

5. The optical scanning apparatus as claimed in claim 3, further comprising preparatory phase setting unit for performing the phase setup within a period before the scanning of the image domain by the laser beam.

6. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
   a sync detection sensor for generating and outputting a sync detection signal that specifies a writing start position of the laser beam in the main scanning direction by detecting the laser beam at a place that is outside of an image domain of the target scanning surface in the main scanning direction,
   a pixel clock generation unit for generating and outputting a pixel clock that is synchronized with the sync detection signal that is output by the sync detection sensor, and
   a phase setting unit for changing a phase of the pixel clock output for each of a plurality of division periods that are formed by dividing a scanning period of the laser beam, wherein the phase setting unit is capable of carrying out a partial phase change that changes the phase in a time period shorter than the period of the pixel clock.

7. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

a sync detection sensor for generating and outputting a sync detection signal that specifies a writing start position of the laser beam in the main scanning direction by detecting the laser beam at a place that is outside of an image domain of the target scanning surface in the main scanning direction, a pixel clock generation unit for generating and outputting a pixel clock that is synchronized with the sync detection signal that is output by the sync detection sensor, and a phase setting unit for changing a phase of the pixel clock output for each of a plurality of division periods that are formed by dividing a scanning period of the laser beam, wherein the phase setting unit is capable of changing a timing of the phase setup for each of the division periods, for each scan of the laser beam.

8. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

a sync detection sensor for generating and outputting a sync detection signal that specifies a writing start position of the laser beam in the main scanning direction by detecting the laser beam at a place that is outside of an image domain of the target scanning surface in the main scanning direction, a pixel clock generation unit for generating and outputting a pixel clock that is synchronized with the sync detection signal that is output by the sync detection sensor, and a phase setting unit for changing a phase of the pixel clock output during a predetermined period within a scanning period of the laser beam, wherein the phase setting unit is capable of carrying out a partial phase change that changes the phase in a time period shorter than one cycle of the pixel clock.

9. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

a sync detection sensor for generating and outputting a sync detection signal that specifies a writing start position of the laser beam in the main scanning direction by detecting the laser beam at a place that is outside of an image domain of the target scanning surface in the main scanning direction, a pixel clock generation unit for generating and outputting a pixel clock that is synchronized with the sync detection signal that is output by the sync detection sensor, and a phase setting unit for changing a phase of the pixel clock output during a predetermined period within a scanning period of the laser beam, wherein the phase setting unit is capable of changing a timing of the phase setup during the predetermined period, for each scan of the laser beam.

10. The image formation apparatus as claimed in claim 8, further comprising preparatory phase setting unit for performing the phase setup within a period before the scanning of the image domain by the laser beam.

11. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

a sync detection sensor for generating and outputting a sync detection signal that specifies a writing start position of the laser beam in the main scanning direction by detecting the laser beam at a place that is outside of an image domain of the target scanning surface in the main scanning direction, a pixel clock generation unit for generating and outputting a pixel clock that is synchronized with the sync detection signal that is output by the sync detection sensor, and a phase setting unit for changing a phase of the pixel clock output for each of a plurality of division periods that are formed by dividing a scanning period of the laser beam, wherein the phase setting unit is capable of carrying out a partial phase change that changes the phase in a time period shorter than one cycle of the pixel clock.

12. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

a sync detection sensor for generating and outputting a sync detection signal that specifies a writing start position of the laser beam in the main scanning direction by detecting the laser beam at a place that is outside of an image domain of the target scanning surface in the main scanning direction, a pixel clock generation unit for generating and outputting a pixel clock that is synchronized with the sync detection signal that is output by the sync detection sensor, a phase setting unit for changing a phase of the pixel clock output for each of a plurality of division periods that are formed by dividing a scanning period of the laser beam, and a pattern formation unit for forming a pattern for detecting an amount of position displacements in image formation on said middle transfer belt, wherein said phase setting unit controls so that timing of the formation of the pattern for detecting the amount of position displacements by the pattern formation unit does not overlap with timing of the phase setting for changing the phase.

13. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:
- a sync detection sensor for generating and outputting a sync detection signal that specifies a writing start position of the laser beam in the main scanning direction by detecting the laser beam at a place that is outside of an image domain of the target scanning surface in the main scanning direction,
- a pixel clock generation unit for generating and outputting a pixel clock that is synchronized with the sync detection signal that is output by the sync detection sensor,
- a phase setting unit for changing a phase of the pixel clock output for each of a plurality of division periods that are formed by dividing a scanning period of the laser beam, and
- a position detection sensor for detecting a pattern for detecting an amount of position displacements, the pattern being formed on the middle transfer belt, wherein the phase setting unit controls so that the timing for detecting the pattern for detecting the amount of position displacements by the position detection sensor does not overlap with the timing for phase setting for changing the phase.

14. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:
- a sync detection sensor for generating and outputting a sync detection signal that specifies a writing start position of the laser beam in the main scanning direction by detecting the laser beam at a place that is outside of an image domain of the target scanning surface in the main scanning direction,
- a pixel clock generation unit for generating and outputting a pixel clock that is synchronized with the sync detection signal that is output by the sync detection sensor,
- a phase setting unit for changing a phase of the pixel clock output for each of a plurality of division periods that are formed by dividing a scanning period of the laser beam, and
- a position detection sensor for detecting a pattern for detecting the amount of position displacements, the pattern being formed on the middle transfer belt, wherein the phase setting unit defines the timing for detection of the pattern for detecting the amount of position displacements by the position detection sensor as a phase setting prohibition timing, at which the phase change is prohibited.

15. The image formation apparatus as claimed in claim 13, wherein a plurality of patterns for detecting the amount of position displacements are arranged on the middle transfer belt, and a plurality of position detection sensors are provided, corresponding to each of the patterns for detecting the amount of position displacements.

16. The image formation apparatus as claimed in claim 13, wherein the detection timing is set corresponding to a range of a beam spot of the laser beam that the position detection sensor detects.

17. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:
- a sync detection sensor for generating and outputting a sync detection signal that specifies a writing start position of the laser beam in the main scanning direction by detecting the laser beam at a place that is outside of an image domain of the target scanning surface in the main scanning direction,
- a pixel clock generation unit for generating and outputting a pixel clock that is synchronized with the sync detection signal that is output by the sync detection sensor, and
- a phase setting unit for changing a phase of the pixel clock output for each of a plurality of division periods that are formed by dividing a scanning period of the laser beam, wherein the phase setting unit changes an amount of phase change for each of the division periods.

18. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:
- sync detection means for generating and outputting a sync detection signal that specifies a writing start position of the laser beam in the main scanning direction by detecting the laser beam at a place that is outside of an image domain of the target scanning surface in the main scanning direction,
- pixel clock generation means for generating and outputting a pixel clock that is synchronized with the sync detection signal that is output by the sync detection means, and
- phase setting means for changing a phase of the pixel clock output for each of a plurality of division periods that are formed by dividing a scanning period of the laser beam, wherein the phase setting means is capable of carrying out a partial phase change that changes the phase in a time period shorter than one cycle of the pixel clock.

19. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output for each of a plurality of division periods that are formed by dividing a scanning period of the laser beam, wherein the phase setting means is capable of changing a timing of the phase setup for each of the division periods, for each scan of the laser beam.

20. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output during a predetermined period within a scanning cycle of the laser beam, wherein the phase setting means is capable of carrying out a partial phase change that changes the phase in a time period shorter than one cycle of the pixel clock.

21. An optical scanning apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output during a predetermined period within a scanning cycle of the laser beam, wherein the phase setting means is capable of changing a timing of the phase setup during the predetermined period, for each scan of the laser beam.

22. The optical scanning apparatus as claimed in claim 20, further comprising preparatory phase setting means for performing the phase setup within a period before the scanning of the image domain by the laser beam.

23. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output for each of a plurality of division periods that are formed by dividing a scanning period of the laser beam, wherein the phase setting means is capable of carrying out a partial phase change that changes the phase in a time period shorter than the period of the pixel clock.

24. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output for each of a plurality of division periods that are formed by dividing a scanning period of the laser beam, wherein the phase setting means is capable of changing a timing of the phase setup for each of the division periods, for each scan of the laser beam.

25. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output during a predetermined period within a scanning period of the laser beam, wherein the phase setting means is capable of carrying out a partial phase change that changes the phase in a time period shorter than one cycle of the pixel clock.

26. An image formation apparatus that produces an electrostatic latent image on a target scanning surface by scanning a laser beam on the target scanning surface in a main scanning direction that is perpendicular to a sub-scanning direction in which the target scanning surface moves, the laser beam being periodically deflected by a rotating polygon mirror, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output during a predetermined period within a scanning period of the laser beam, wherein the phase setting means is capable of changing a timing of the phase setup during the predetermined period, for each scan of the laser beam.

27. The image formation apparatus as claimed in claim 25, further comprising preparatory phase setting means for performing the phase setup within a period before the scanning of the image domain by the laser beam.

28. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output for each of a plurality of division periods that are formed by dividing a scanning period of the laser beam, wherein the phase setting means is capable of carrying out a partial phase change that changes the phase in a time period shorter than one cycle of the pixel clock.

29. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, phase setting means for changing a phase of the pixel clock output for each of a plurality of division periods that are formed by dividing a scanning period of the laser beam, and pattern formation means for forming a pattern for detecting an amount of position displacements in image formation on said middle transfer belt, wherein said phase setting means controls so that timing of the formation of the pattern for detecting the amount of position displacements by the pattern formation means does not overlap with timing of the phase setting for changing the phase.

30. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, phase setting means for changing a phase of the pixel clock output for each of a plurality of division periods that are formed by dividing a scanning period of the laser beam, and a position detection sensor for detecting a pattern for detecting an amount of position displacements, the pattern being formed on the middle transfer belt, wherein the phase setting means controls so that the timing for detecting the pattern for detecting the amount of position displacements by the position detection sensor does not overlap with the timing for phase setting for changing the phase.

31. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, phase setting means for changing a phase of the pixel clock output for each of a plurality of division periods that are formed by dividing a scanning period of the laser beam, and a position detection sensor for detecting a pattern for detecting the amount of position displacements, the pattern being formed on the middle transfer belt, wherein the phase setting means defines the timing for detection of the pattern for detecting the amount of position displacements by the position detection sensor as a phase setting prohibition timing, at which the phase change is prohibited.

32. The image formation apparatus as claimed in claim 30, wherein a plurality of patterns for detecting the amount of position displacements are arranged on the middle transfer belt, and a plurality of position detection sensors are provided, corresponding to each of the patterns for detecting the amount of position displacements.

33. The image formation apparatus as claimed in claim 30, wherein the detection timing is set corresponding to a range of a beam spot of the laser beam that the position detection sensor detects.

34. An image formation apparatus that produces an electrostatic latent image on a target scanning surface assigned for each of a plurality of colors by scanning a laser beam on the target scanning surface in a main scanning direction that is perpendicular to a sub-scanning direction in which the target scanning surface moves, the laser beam being periodically deflected by a rotating polygon mirror, the latent image in each of the plurality of colors being developed to form a toner image in each color, the toner image in each color being transferred to a middle transfer belt, and the toner image in each color transferred to the middle transfer belt being transferred to a sheet of paper, comprising:

sync detection means for generating and outputting a sync detection signal that specifies a writing start position of the laser beam in the main scanning direction by detecting the laser beam at a place that is outside of an image domain of the target scanning surface in the main scanning direction, pixel clock generation means for generating and outputting a pixel clock that is synchronized with the sync detection signal that is output by the sync detection means, and phase setting means for changing a phase of the pixel clock output for each of a plurality of division periods that are formed by dividing a scanning period of the laser beam, wherein the phase setting means changes an amount of phase change for each of the division periods.

* * * * *